(12) United States Patent
Nakai et al.

(10) Patent No.: US 6,706,446 B2
(45) Date of Patent: Mar. 16, 2004

(54) NON-AQUEOUS ELECTROLYTIC SOLUTION SECONDARY BATTERY

(75) Inventors: Kenji Nakai, Fukaya (JP); Yoshimasa Koishikawa, Honjou (JP); Yuichi Takatsuka, Osato-gun (JP); Kensuke Hironaka, Fukaya (JP); Takeshi Nakano, Kumagaya (JP); Youshin Yagi, Osato-gun (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 170 days.

(21) Appl. No.: 09/977,305

(22) Filed: Oct. 16, 2001

(65) Prior Publication Data

US 2002/0122983 A1 Sep. 5, 2002

(30) Foreign Application Priority Data

| Dec. 26, 2000 | (JP) | ................................. | 2000-394023 |
| Dec. 26, 2000 | (JP) | ................................. | 2000-394095 |
| Dec. 28, 2000 | (JP) | ................................. | 2000-401204 |
| Feb. 7, 2001 | (JP) | ................................. | 2001-030322 |
| Feb. 7, 2001 | (JP) | ................................. | 2001-030338 |

(51) Int. Cl.$^7$ ............................. H01M 4/58; H01M 4/00
(52) U.S. Cl. ...................... 429/231.1; 429/224; 429/94
(58) Field of Search ........................... 429/224, 231.1, 429/231.95, 53, 176, 94

(56) References Cited

U.S. PATENT DOCUMENTS

| 5,962,167 | A | * | 10/1999 | Nakai et al. ............. 429/231.1 |
| 6,270,926 | B1 | * | 8/2001 | Yamashita et al. ........ 429/231.1 |
| 6,447,946 | B1 | * | 9/2002 | Nakai et al. ................ 429/53 |
| 6,509,114 | B1 | * | 1/2003 | Nakai et al. ................ 429/94 |
| 2002/0102460 | A1 | * | 8/2002 | Nakai et al. ............... 429/224 |

FOREIGN PATENT DOCUMENTS

| EP | 0 820 113 A1 | 1/1998 | | |
| EP | 1 049 187 A2 | 11/2000 | | |
| EP | 1 049 189 A1 | 11/2000 | | |
| EP | 1052716 | * 11/2000 | ............ | H01M/4/52 |
| JP | A 10-321225 | 12/1998 | | |
| JP | A 11-176441 | 7/1999 | | |
| JP | A 2000-277095 | 10/2000 | | |
| JP | A 2000-311676 | 11/2000 | | |
| JP | A 2001-15173 | 1/2001 | | |
| JP | A 2001-35480 | 2/2001 | | |
| JP | A 2001-118569 | 4/2001 | | |
| JP | A 2001-210383 | 8/2001 | | |

* cited by examiner

Primary Examiner—Stephen Kalafut
Assistant Examiner—Raymond Alejandro
(74) Attorney, Agent, or Firm—Oliff & Berridge, PLC

(57) ABSTRACT

A cylindrical lithium-ion battery 20 accommodates a winding group 6, is structured by winding a positive electrode using lithium manganate ($Li_{1+x}Mn_{2-x}O_4$ or $Li_{1+x}Mn_{2-x-y}Al_yO_4$) having an average particle diameter of primary particles in a range of from 0.1 $\mu$m to 2 $\mu$m as a positive electrode active material and a negative electrode using amorphous carbon as a negative electrode active material via a separator, and a non-aqueous electrolytic solution within a battery container 7.

26 Claims, 2 Drawing Sheets

NON-AQUEOUS ELECTROLYTIC SOLUTION SECONDARY BATTERY

FIELD OF THE INVENTION

The present invention relates to a non-aqueous electrolytic solution secondary battery, and in particular relates to a non-aqueous electrolytic solution secondary battery where an electrode winding group where a positive electrode formed by applying positive electrode active material including a lithium-manganese complex oxide comprising secondary particles formed of aggregated primary particles and conductive material on both surfaces of a strip-like collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure.

DESCRIPTION OF THE RELATED ART

Because a non-aqueous electrolytic solution secondary battery represented by a lithium-ion secondary battery has a high energy density as its merit, it is mainly used as a power source or power supply for portable equipment such as a VTR camera, a notebook type personal computer, a portable or cellar telephone or the like. The interior structure of this battery is generally of a winding type as described below. Each of a positive electrode and a negative electrode of the electrodes of the battery is formed in a strip-shape where active material is applied to a metal foil, and a winding group is spirally formed by winding the positive electrode and the negative electrode through a separator so as not to come in direct contact with each other. This winding group is accommodated in a cylindrical battery container or can, and after the battery container is filled with electrolytic solution, it is sealed.

An ordinary cylindrical lithium-ion secondary battery has an external dimension of a diameter of 18 mm and a height of 65 mm, which is called 18650 type, and it is widely spread as a small-sized non-aqueous electrolytic solution secondary battery for a civilian use. Carbon material is ordinarily used as a negative electrode active material for the 18650 type lithium-ion secondary battery. The carbon material used may include graphite system material such as natural graphite, scale-shaped, aggregated artificial graphite, mesophase pitch system graphite, and amorphous carbon material prepared by sintering such furan resin as furfuryl alcohol or the like. On the other hand, as a positive electrode active material, one of lithium transition metallic complex oxides is used. Among the lithium transition metallic complex oxides, lithium cobaltate ($LiCoO_2$) is widely used in view of balance of capacity, cycle characteristic or the like. Battery capacity of the 18650 type lithium-ion battery is approximately 1.3 Ah to 1.7 Ah and battery power (output) thereof is about 10 W or so.

Meanwhile, in order to cope with the environmental problems in the automotive industry, development of electric vehicles (EVs) whose power sources are confined completely to batteries so that there is no gas exhausting and development of hybrid electric vehicles (HEVs) where both internal combustion engines and batteries are used as their power sources have been facilitated and some of them have reached a practical state.

Secondary batteries for the EVs and HEVs are required to have high power and high-energy characteristics. Attention to the lithium-ion secondary batteries is being paid as secondary batteries which can meet this requirement. In order to spread the EVs and HEVs, it is necessary to reduce the prices of the secondary batteries. Low cost battery materials are required for achieving such price reduction. For example, regarding the positive electrode active material, special attention is paid to manganese oxides which are rich as resources, and improvement of such batteries has been made for high performance thereof. However, it is not considered that the power characteristic of the lithium-ion secondary battery using lithium-manganese complex oxide as the positive electrode active material is sufficient for the EVs and HEVs. In order to solve this problem, it has been studied that the area of the electrode is enlarged to achieve high capacity of the battery. However, such enlargement causes an increase in a battery size, which results in a practical difficulty in view of a mounting space for the battery in a vehicle.

Also, as the battery for the EVs and HEVs, not only high capacity but also high power which affect acceleration performance of a vehicle, namely reduction of the internal resistance of the battery, is required. In order to increase the reaction area of the electrode, this requirement can be met by utilizing a lithium-manganese complex oxide as the positive electrode active material. In particular, in order to increase a specific surface area, it is necessary to reduce the particle diameter of the lithium-manganese complex oxide. However, in a case of the small particle diameter, there occurs such a drawback that powder material is scattered during manufacture of an electrode or it is difficult to obtain appropriate slurry for applying the lithium-manganese complex oxide on both surfaces of a collector. It is possible to solve such a problem by utilizing a lithium-manganese complex oxide formed by secondary particles obtained by aggregating primary particles having a small particle diameter.

Moreover, in a case that a non-aqueous electrolytic solution secondary battery with a high power, as a contrivance for reducing reaction resistance between the positive electrode active material and the non-aqueous electrolytic solution, there has been known such a technique that the positive and negative electrodes are made thinner for reducing diffusion distance of lithium ions between the positive and negative electrodes or they are made longer for increasing the reaction areas of the positive and negative electrodes and so on. However, because large power is required in a case of a secondary battery for an electric vehicle, particularly for the HEV, the space in the battery is mainly occupied by portions other than the positive electrode active material so that the occupation volume of the positive electrode active material in the battery is reduced in the technique where the positive and negative electrodes is made thinner and/or longer. As a result, it is necessary to reduce the filling weight of the positive electrode active material. Such reduction means an increase in load per unit positive electrode active material. Because lithium ions are temporarily concentrated on a surface of the positive electrode active material during high rate charging/discharging cycle conducted by pulse-like current, particularly during discharging cycle, it becomes difficult to occlude lithium ions to a portion corresponding to a normal reaction side and load acting on the positive electrode active material is increased. Accordingly, when the pulse charging/discharging cycle is repeated for a long term, there has been a problem that the structural destruction of the positive electrode active material is caused according to over-voltage, which results in a large reduction in power of the battery.

In addition, in the case of the lithium-ion secondary battery, as the capacity and/or power thereof is increased, the safety thereof is apt to lower. Particularly, as mentioned above, in the non-aqueous electrolytic solution secondary battery for obtaining a high power (performance), such a tendency is observed that the phenomenon becomes intense when the battery falls in an abnormal state. That is, in reaction of the lithium-ion secondary battery at a time of over-charged state thereof, all lithium ions are released from the positive electrode active material and the structure of the active material is made unstable according to the over-voltage, so that the non-aqueous electrolytic solution becomes easy to decompose. When the non-aqueous electrolytic solution is decomposed, oxygen releasing reaction occurs according to the decomposition of the non-aqueous electrolytic solution in the boundary face where the lithium-manganese complex oxide and the non-aqueous electrolytic solution come in contact with each other. When the particle of the lithium-manganese complex oxide is small, since the area per unit volume of the boundary between the lithium-manganese complex oxide and the non-aqueous electrolytic solution increases and the oxygen releasing reaction increases, there is a problem that heat generation of the small particle due to the structural destruction thereof promotes the structural destruction of adjacent particles to cause heat generation due to chain structural destruction and to reach energy causing the structural destruction of the entire of the positive electrode active material so that heat generation of the battery and/or white smoke emission from the internal pressure releasing mechanism is caused.

In a case of such a high capacity and high power battery as used for power supply for an electric vehicle, because a large current charging and/or a large current discharging is caused at a normal using time of the battery, it is practically difficult to provide within the battery structure a current shutting-off mechanism (a kind of a shutting-off switch) actuated according to an increase in battery internal pressure at an abnormal time of battery, which is generally employed in the 18650 type lithium-ion secondary battery.

In a case of an electric vehicle for passengers, it is very important battery characteristic which is at least required that the safety of the battery itself is secured at a time of over-charging occurring in a case that a charging control system has broken down, at a time of battery crushing which may be caused in a case of accidental vehicle collision, at a time of foreign matter spitting, at a time of externally short-circuiting or the like. Incidentally, the safety of battery means not only that the behavior of the battery does not injure a person physically even when the battery has been put in an abnormal state but also that an damage to the vehicle is suppressed to the minimum range even in such a state.

SUMMARY OF THE INVENTION

In view of the above circumstances, a first object of the present invention is to provide a non-aqueous electrolytic solution secondary battery whose power characteristic is improved without enlarging the size of the battery. Also, a second object of the present invention is to provide a non-aqueous electrolytic solution secondary battery which has a high safety level while having high capacity, high energy density and high power (performance). Further, a third object of the present invention is to provide a non-aqueous electrolytic solution secondary battery which can maintain high power even when a pulse charging/discharging cycle is repeated for a long term.

In order to achieve the first object, the present invention is a non-aqueous electrolytic solution secondary battery where an electrode winding group where a positive electrode formed by applying positive electrode active material mixture including a lithium-manganese complex oxide comprising secondary particles formed of aggregated primary particles and conductive material on both surfaces of a strip-like collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure, wherein an average particle diameter (particle size) of the primary particles of the lithium-manganese complex oxide is in a range of from 0.1 $\mu$m to 2 $\mu$m.

In the present invention, when the lithium-manganese complex oxide where the average particle diameter of the primary particles is less than 0.1 $\mu$m is used as the positive electrode active material, because the reaction area is increased but crystals in the material do not have grown sufficiently, the reaction resistance is increased and the power of the non-aqueous electrolytic solution secondary battery is lowered. On the other hand, when the lithium-manganese complex oxide where the average particle diameter of the primary particles is more than 2 $\mu$m is used, because the reaction area is decreased and the current density per unit positive electrode active material becomes large, the power of the non-aqueous electrolyte solution secondary battery is lowered. Therefore, by using the lithium-manganese complex oxide where the average particle diameter of the primary particles is in the range of from 0.1 $\mu$m to 2 $\mu$m, the reaction area of the positive electrode active material is optimized so that the non-aqueous electrolytic solution secondary battery whose power characteristic is improved can be obtained without enlarging the size of the secondary battery.

At this time, by using the lithium-manganese complex oxide where a Li/Mn composition ratio is in the range of from 0.55 to 0.60, the amount of elution of manganese can be reduced without extremely lowering the discharging capacity of the secondary battery as compared with stoichiometric composition (Li/Mn=0.5). It is preferable that a complex oxide expressed by a chemical formula $Li_{1+x}Mn_{2-x}O_4$ or a complex oxide where a portion of manganese has been substituted for another metal element is used.

Also, in order to achieve the second object, the present invention is a non-aqueous electrolytic solution secondary battery according to the first aspect, wherein the amount of application of the lithium-manganese complex oxide per one side surface of the collector is in the range of from 80 g/m$^2$ to 160 g/m$^2$ and the amount of conductive material included in the positive electrode active material mixture is in the range of from 8 weight % to 16 weight %, or wherein the amount of application of the lithium-manganese complex oxide per one side surface of the collector is in the range of from 270 g/m$^2$ to 330 g/m$^2$ and the amount of conductive material included in the positive electrode active material is in the range of from 3 weight % to 7 weight %.

In a non-aqueous electrolytic solution secondary battery having high capacity and high power (performance), when it falls in an abnormal state, large current charging or large current discharging state is maintained so that a large amount of gas is generated rapidly due to chemical reaction between the non-aqueous electrolytic solution and the active material mixture within the battery container and internal pressure in the battery container is increased. In the non-aqueous electrolytic solution secondary battery, for preventing the internal pressure in the battery container from increasing, the battery container is generally provided with an internal pressure releasing mechanism. By employing such settings that the amount of application of the lithium-manganese complex oxide per one side surface of the collector is in the range of from 80 g/m$^2$ to 160 g/m$^2$ and the amount of conductive material included in the positive electrode active material is in the range of from 8 weight % to 16 weight %, or the amount of application of the lithium-manganese complex oxide per one side surface of the collector is in the range of from 270 g/m$^2$ to 330 g/m$^2$ and the amount of conductive material included in the positive electrode active material is in the range of from 3 weight % to 7 weight %, gas discharging from the internal pressure releasing mechanism is conducted remarkably gently. For this reason, according to the present invention, a non-aqueous electrolytic solution secondary battery which has a high safety while maintaining a high capacity and a high power can be realized.

In this case, by using mixture of graphite and amorphous carbon as the conductive material, a non-aqueous electrolytic solution secondary battery with higher power can be manufactured. At this time, when the average particle diameter of the graphite is in the range of from 0.2 to 0.8 times as large as the average particle diameter of the secondary particle and/or acetylene black is used as the amorphous carbon, a non-aqueous electrolytic solution secondary battery whose power is further increased can be obtained. Also, when the Li/Mn composition ratio in the lithium-manganese complex oxide is in the range of from 0.55 to 0.60, the power maintaining rate of the battery can be improved without causing reduction of the capacity thereof. Further, when amorphous carbon is used as the active material for the negative electrode, a non-aqueous electrolytic solution secondary battery with higher power, higher capacity and further excellent safety can be manufactured.

Further, in order to achieve the second object, such constitution can be employed that the lithium-manganese complex oxide which is expressed by a chemical formula $Li_{1+x}Mn_{2-x}O_4$ or where a portion of manganese in the chemical formula has been substituted for or doped with another metal element is used and the weight of the particles of the lithium-manganese complex oxide with a particle diameter of 1 μm or less is 0.1% or less of the total weight of the lithium-manganese complex oxide. With this constitution, because the area per unit volume of the boundary between the lithium-manganese complex oxide and the non-aqueous electrolytic solution is reduced and heat generation due to oxygen elution reaction can be made small, a chain-like reaction between the positive electrode active material and the non-aqueous electrolytic solution can be suppressed. Accordingly, a non-aqueous electrolytic solution secondary battery which has an excellent safety while achieving a high energy density and a high power can be realized. In this case, when the specific surface of the positive electrode active material is set to 0.6 m$^2$/g or less, because the area of the boundary between the positive electrode active material and the non-aqueous electrolytic solution can be reduced so that the chain reaction can be suppressed, a non-aqueous electrolytic solution secondary battery whose safety is further enhanced can be obtained.

In order to achieve the third object, the present invention is a non-aqueous electrolytic solution secondary battery wherein the lithium-manganese complex oxide which is expressed by a chemical formula $Li_{1+x}Mn_{2-x}O_4$ or where a portion of manganese in the chemical formula has been substituted with or doped with another metal element is used and the weight of the particles of the lithium-manganese complex oxide which have a particle diameter of 1 μm or less is in the range of from 0.01% to 2%. In the present invention, by setting the weight of the particles with a particle diameter of 1 μm or less to at most 0.01% of the total weight of the lithium-manganese complex oxide, space around respective particles with a particle diameter of 1 μm or less is filled with the non-aqueous electrolytic solution and these particles are infiltrated with the non-aqueous electrolytic solution uniformly. For this reason, it is considered that, even when the pulse charging/discharging cycle is performed for a long term, because lithium ions are occluded into the positive electrode active material smoothly, the discharging reaction progresses easily and any voltage difference in the positive electrode active material does not occur so that a structural destruction does not occur. In this manner, such an effect can be expected that the particles having a particle diameter of 1 μm or less reduce discharging load acting on the whole positive electrode. On the other hand, when the weight of the particles with a particle diameter of 1 μm or less is 2% or more, binding force among the positive electrode active material particles is weakened and the positive electrode active material particles fall off from the positive electrode for a long term pulse charging/discharging cycle, which causes lowering of the power. Therefore, it is necessary to set the weight of the particles of the positive electrode active material having a particle diameter of 1 μm or less to at most 2%. According to the present invention, by setting the weight of the particles of the positive electrode active material with a particle diameter of 1 μm or less the range of from 0.01% to 2% of the total weight of the positive electrode active material, a non-aqueous electrolytic solution secondary battery which can maintain a high power even when the pulse charging/discharging cycle is repeated for a long term can be obtained. In this case, even when the specific surface area of the positive electrode active material is set to 0.6 m$^2$/g or more, such an effect is expected that the reaction area increases and the discharging reaction progresses so that the discharging load acting on the whole positive electrode can be reduced. Meanwhile, when the specific surface area is made larger than 2.0 m$^2$/g, the amount of elution of manganese ions retained at a high temperature increases, which makes current flow difficult, and the power is lowered due to the capacity reduction. Therefore, it is preferable that the specific surface area of the positive electrode active material is set to the range of from 0.6 m$^2$/g to 2.0 m$^2$/g.

Figure 1:
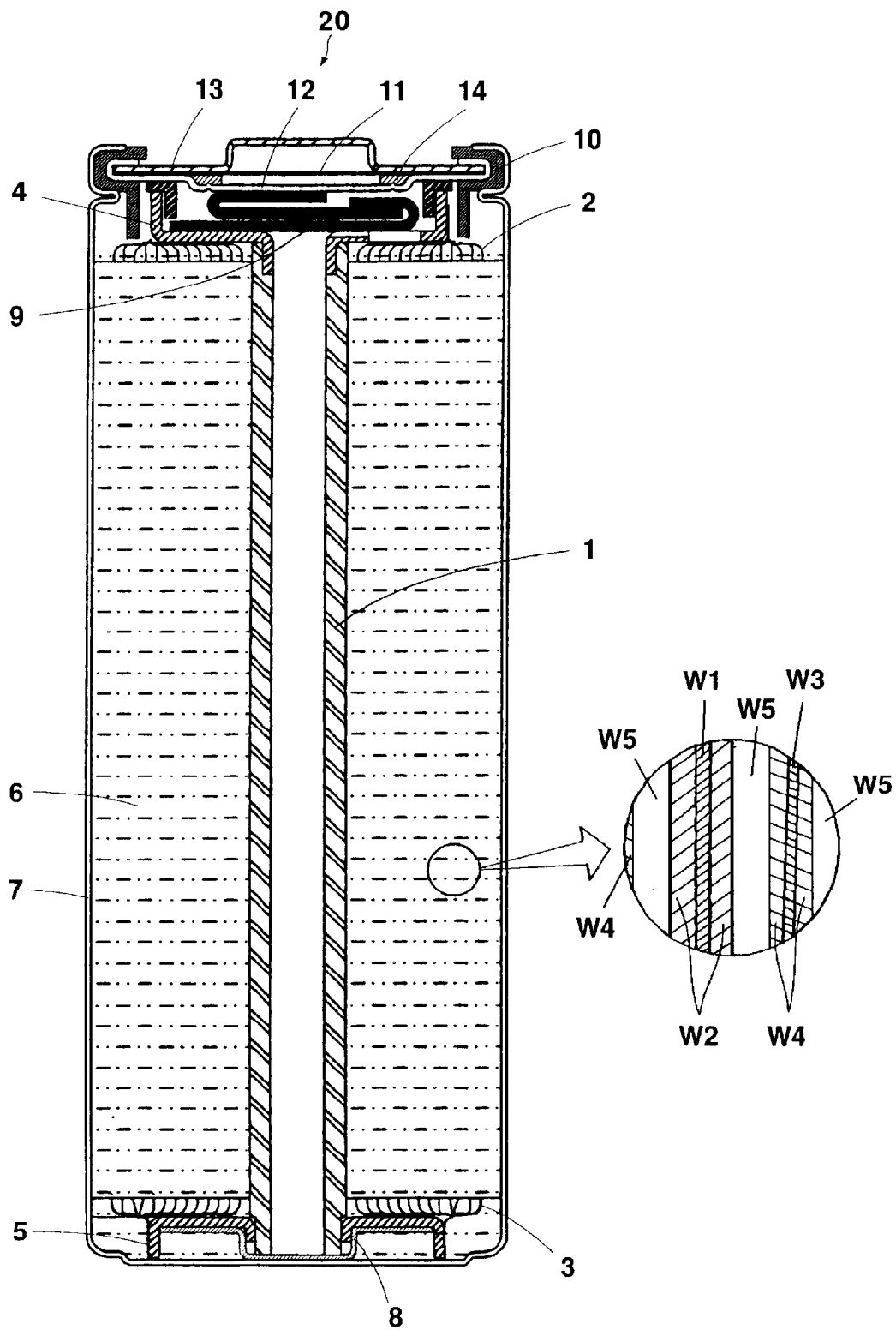
FIG. 1 is a sectional view of a cylindrical lithium-ion secondary battery of a first embodiment to which the present invention is applicable.

DETAILED DESCRIPTION OF THE PREFERRED EMBODIMENTS (First Embodiment)

A first embodiment where a non-aqueous electrolytic solution secondary battery according to the present invention is applied to a cylindrical lithium-ion battery for HEV will be explained below with reference to the drawing.

(Positive Electrode)

As shown in FIG. 1, a powdered lithium manganate ($LiMn_2O_4$) serving as a positive electrode active material, a predetermined carbon serving as conductive material, which is described later, and a polyvinylidene fluoride (PVDF) as a binder are mixed at a predetermined ratio, the resultant mixture is added and mixed with N-methyl-2-pyrrolidone (NMP) as dispersion solvent to produce slurry. The slurry thus produced is applied to both surfaces of an aluminum foil W1 (positive electrode collector) having a thickness of 20 μm. At this time, a non-coated portion with a width of 30 mm is left on one side edge, in a longitudinal direction, of the positive electrode. Thereafter, the aluminum foil W1 thus applied with the mixture is dried, pressed and cut to produce a positive electrode having a width of 82 mm, a predetermined length and a predetermined thickness of the active material mixture applied portion. The apparent density of the positive electrode active material mixture layer W2 is set to 2.65 g/cm$^3$. The non-coated portion is formed with notched portions, and the remaining portion thereof serves as positive electrode lead pieces 2. The distance or interval between the adjacent positive electrode lead pieces 2 is set to 50 mm and the width of each positive electrode lead piece 2 is set to 5 mm.

(Negative Electrode)

92 weight parts of a predetermined carbon powder is added with 8 weight parts of a polyvinylidene fluoride as a binder, and is further added and mixed with N-methyl-2-pyrrolidone as dispersion solvent to produce slurry. The slurry thus produced is applied to both surfaces of a rolled copper foil W3 (negative electrode collector) having a thickness of 10 μm. At this time, a non-coated portion with a width of 30 mm is left on one side edge, in a longitudinal direction, of the negative electrode. Thereafter, the rolled copper foil W3 thus applied with the mixture is dried, pressed and cut to produce a negative electrode having a width of 86 mm, a predetermined length and a predetermined thickness of the active material mixture applied portion. The negative electrode is pressed such that the porosity of the negative electrode active material mixture layer W4 is set to about 35%. The non-coated portion is formed with notched portions like the case of the positive electrode, and the remaining portion thereof serves as negative electrode lead pieces 3. The distance or interval between the adjacent negative electrode lead pieces 3 is set to 50 mm and the width of each negative electrode lead piece 3 is set to 5 mm.

(Manufacture of Battery)

The positive electrode and the negative electrode thus manufactured are wound together with a separator W5 made of polyethylene and having a width of 90 mm and a thickness of 40 μm such that both the electrodes do not come in direct contact with each other. A hollow cylindrical shaft rod 1 made of polypropylene is used at a center of the winding. At this time, the positive electrode lead pieces 2 and the negative electrode lead pieces 3 are respectively positioned at both end faces opposed to each other with respect to a winding group 6. Also, the lengths of the positive electrode, the negative electrode and the separator are adjusted to set the diameter of the winding group 6 to 38±0.1 mm.

After all the positive electrode lead pieces 2 are deformed to be collected about and brought in contact with a peripheral face of a flange portion extended integrally from a periphery of a positive electrode collecting ring 4 positioned on an extension line of the shaft rod 1 of the winding group 6, the positive electrode lead pieces 2 and the peripheral face of the flange portion are welded to each other in a ultrasonic manner so that the positive electrode lead pieces 2 are connected to the peripheral face of the flange portion. Meanwhile, connecting operation between a negative electrode collecting ring 5 and the negative electrode lead pieces 3 is performed like the connecting operation between the positive electrode collecting ring 4 and the positive electrode lead pieces 2.

Thereafter, insulating covering is applied on the entire circumferential surface of the flange portion of the positive electrode collecting ring 4. An adhesive tape comprising a base member made of polyimide and adhesive agent made of hexameta-acrylate and applied to one surface thereof is used for the insulating covering. This adhesive tape is wound at least one time from the peripheral surface of the flange portion to the outer peripheral surface of the winding group 6, thereby forming the insulating covering. The winding group 6 is inserted into a battery container 7 made of steel and nickel-plated. The outer diameter of the battery container 7 is 40 mm and the inner diameter thereof is 39 mm.

A negative electrode lead plate 8 for electric conduction is welded to the negative electrode collecting ring 5 in advance, and after insertion of the winding group 6 into the battery container 7, a bottom portion of the battery container 7 and the negative electrode lead plate 8 are welded to each other.

Meanwhile, one end of a positive electrode lead 9 configured by stacking a plurality of ribbons made of aluminum is welded to the positive electrode collecting ring 4 in advance, and the other end thereof is welded to a lower surface of a battery lid for sealing the battery container 7. The battery lid is provided with a cleavage valve 11 which cleaves according to an increase in battery internal pressure in the cylindrical lithium-ion battery 20 and which serves as an internal pressure releasing mechanism. The cleavage valve 11 is set to cleaving pressure of about 9×10$^5$ Pa. The battery lid comprises a lid case 12, a lid cap 13, a valve retainer 14 for keeping air-tightness, and the cleavage valve 11, and the battery container is assembled by stacking these members to caulk a peripheral edge of the lid case 12.

Non-aqueous electrolytic solution is injected to the battery container 7 by a predetermined amount, the battery lid is then fitted to the battery container 7 in a folding manner of the positive electrode lead 9, and the battery container 7 is sealed by performing caulking via a gasket 10 made of EPDM resin so that the cylindrical lithium-ion battery 20 is completed.

The non-aqueous electrolytic solution is prepared previously in the following manner: A lithium hexafluorophosphate (LiPF$_6$) is dissolved at 1 mole/liter into mixed solution of ethylene carbonate, dimethyl carbonate and diethyl carbonate at a volume ratio of 1:1:1. Incidentally, the cylindrical lithium-ion battery 20 is not provided with a current shutting-off or reducing mechanism, for example, such as a PTC (Positive Temperature Coefficient) element or the like, which operates according to an increase in battery temperature.

Next, Examples of the cylindrical lithium-ion battery 20 manufactured according to the present embodiment will be explained. Incidentally, batteries of Controls (Comparative examples) manufactured for making a comparison with the batteries of Examples will also be explained below.

EXAMPLE 1-1

As shown in the following Table 1, in Example 1-1, lithium manganate (LiMn$_2$O$_4$) powder where the primary particle diameter was in a range of from about 1 to 2 μm, the secondary particle diameter was about 20 μm, the atom ratio (Li/Mn ratio) of Li to Mn was 0.52, scale-shaped graphite having an average particle diameter of 18 μm, and polyvinylidene fluoride were mixed at a composition ratio of 83:12:5 at weight %. The amount of application of the lithium manganate of the positive electrode active material mixture layer (active material applied portion) W2 per one side surface of the collector was 80 g/m², the thickness (which did not include the thickness of the collector) of the positive electrode active material mixture layer (active material applied portion) W2 was 73 μm, and the length of the positive electrode was 434 cm. The average particle diameter of the scale-shaped graphite to the secondary particle diameter of the $LiMn_2O_4$ was 0.9 times. Meanwhile, in the negative electrode, MCMB which is mesophase system spherical graphite was used as the negative electrode active material. The thickness (which did not include the thickness of the collector) of the negative electrode active material mixture layer (active material applied portion) W4 was 53 μm, and the length thereof was 446 cm. Incidentally, the average particle diameter of the scale-shaped graphite can be adjusted by screening.

negative electrode active material applied portion W4 in a direction perpendicular to the winding direction (which is the same in the following Examples and Controls).

EXAMPLE 1-2

As shown in Table 1, in Example 1-2, a battery was manufactured in the same manner as the Example 1-1 except that the amount of application of lithium manganate was 120 g/m², the thickness (which did not include the thickness of the collector) of the positive electrode active material mixture layer (active material applied portion) W2 was 109 μm, the length of the positive electrode was 342 cm, the thickness (which did not include the thickness of the collector) of the negative electrode active material mixture layer (active material applied portion) W4 was 79 μm, and the length of the negative electrode was 354 cm.

EXAMPLES 1-2-2 TO 1-2-5

As shown in Table 1, in Examples 1-2-2 to 1-2-5, each battery was manufactured in the same manner as the

TABLE 1

| | POSITIVE ELECTRODE | | | | | | | NEGATIVE ELECTRODE | | |
|---|---|---|---|---|---|---|---|---|---|---|
| | | appln. | | | | conductive | | graphite particle | | |
| | Li/Mn ratio | Amount (g/m²) | Tp (μm) | Lp (cm) | material amount (wt %) | conductive | material | diameter (to $LiMn_2O_4$) | active material | Tn (μm) | Ln (cm) |
| Example 1-1 | 0.52 | 80 | 73 | 434 | 12 | G | — | 0.9 | MCMB | 53 | 446 |
| Example 1-2 | 0.52 | 120 | 109 | 342 | 12 | G | — | 0.9 | MCMB | 79 | 354 |
| Example 1-2-2 | 0.55 | 120 | 109 | 342 | 12 | G | — | 0.9 | MCMB | 79 | 354 |
| Example 1-2-3 | 0.58 | 120 | 109 | 342 | 12 | G | — | 0.9 | MCMB | 79 | 354 |
| Example 1-2-4 | 0.60 | 120 | 109 | 342 | 12 | G | — | 0.9 | MCMB | 79 | 354 |
| Example 1-2-5 | 0.61 | 120 | 109 | 342 | 12 | G | — | 0.9 | MCMB | 79 | 354 |
| Example 1-3 | 0.52 | 160 | 146 | 282 | 12 | G | — | 0.9 | MCMB | 106 | 294 |
| Example 1-4 | 0.52 | 120 | 104 | 348 | 8 | G | — | 0.9 | MCMB | 79 | 360 |
| Example 1-5 | 0.52 | 120 | 115 | 336 | 16 | G | — | 0.9 | MCMB | 79 | 348 |
| Example 1-6 | 0.52 | 120 | 109 | 342 | 12 | G | KB | 0.9 | MCMB | 79 | 354 |
| Example 1-7 | 0.52 | 120 | 109 | 342 | 12 | G | KB | 0.1 | MCMB | 79 | 354 |
| Example 1-8 | 0.52 | 120 | 109 | 342 | 12 | G | KB | 0.2 | MCMB | 79 | 354 |
| Example 1-9 | 0.52 | 120 | 109 | 342 | 12 | G | KB | 0.5 | MCMB | 79 | 354 |
| Example 1-10 | 0.52 | 120 | 109 | 342 | 12 | G | KB | 0.8 | MCMB | 79 | 354 |
| Example 1-11 | 0.52 | 120 | 109 | 342 | 12 | G | AB | 0.5 | MCMB | 79 | 354 |
| Example 1-12 | 0.55 | 120 | 109 | 342 | 12 | G | AB | 0.5 | MCMB | 79 | 354 |
| Example 1-13 | 0.58 | 120 | 109 | 342 | 12 | G | AB | 0.5 | MCMB | 79 | 354 |
| Example 1-14 | 0.60 | 120 | 109 | 342 | 12 | G | AB | 0.5 | MCMB | 79 | 354 |
| Example 1-15 | 0.61 | 120 | 109 | 342 | 12 | G | AB | 0.5 | MCMB | 79 | 354 |
| Example 1-16 | 0.52 | 120 | 109 | 342 | 12 | G | AB | 0.5 | AC | 79 | 354 |
| Example 1-16-2 | 0.55 | 120 | 109 | 342 | 12 | G | AB | 0.5 | AC | 79 | 354 |
| Example 1-16-3 | 0.58 | 120 | 109 | 342 | 12 | G | AB | 0.5 | AC | 79 | 354 |
| Example 1-16-4 | 0.60 | 120 | 109 | 342 | 12 | G | AB | 0.5 | AC | 79 | 354 |
| Example 1-16-5 | 0.61 | 120 | 109 | 342 | 12 | G | AB | 0.5 | AC | 79 | 354 |
| Example 1-17 | 0.52 | 120 | 109 | 342 | 12 | G | — | 0.5 | AC | 79 | 354 |
| Example 1-17-2 | 0.55 | 120 | 109 | 342 | 12 | G | — | 0.5 | AC | 79 | 354 |
| Example 1-17-3 | 0.58 | 120 | 109 | 342 | 12 | G | — | 0.5 | AC | 79 | 354 |
| Example 1-17-4 | 0.60 | 120 | 109 | 342 | 12 | G | — | 0.5 | AC | 79 | 354 |
| Example 1-17-5 | 0.61 | 120 | 109 | 342 | 12 | G | — | 0.5 | AC | 79 | 354 |
| Control 1-1 | 0.52 | 75 | 68 | 450 | 12 | G | — | 0.9 | MCMB | 50 | 462 |
| Control 1-2 | 0.52 | 165 | 150 | 276 | 12 | G | — | 0.9 | MCMB | 109 | 288 |
| Control 1-3 | 0.52 | 120 | 103 | 349 | 7 | G | — | 0.9 | MCMB | 80 | 361 |
| Control 1-4 | 0.52 | 120 | 116 | 334 | 17 | G | — | 0.9 | MCMB | 80 | 346 |

Incidentally, in the electrodes manufactured, the length of the negative electrode was set to be longer than that of the positive electrode by 12 cm such that, when wounded, the positive electrode did not protrude at the innermost layer of the winding from the negative electrode in a winding direction and the positive electrode did not protrude at the outermost layer of the winding from the negative electrode in the winding direction. Also, the width of the negative electrode active material applied portion W4 was set to be longer than that of the positive electrode active material applied portion W2 by 4 mm such that the positive electrode active material applied portion W2 did not protrude from the Example 1-2 except that the Li/Mn ratio of lithium manganate was 0.55, 0.58, 0.60 or 0.61.

EXAMPLE 1-3

As shown in Table 1, in Example 1-3, a battery was manufactured in the same manner as the Example 1-1 except that the amount of application of lithium manganate was 160 g/m², the thickness (which did not include the thickness of the collector) of the positive electrode active material mixture layer (active material applied portion) W2 was 146 μm, the length of the positive electrode was 282 cm, the thickness (which did not include the thickness of the collector) of the negative electrode active material mixture layer (active material applied portion) W4 was 106 μm, and the length of the negative electrode was 294 cm.

EXAMPLE 1-4

As shown in Table 1, in Example 1-4, a battery was manufactured in the following manner. The same lithium manganate powder as that in the Example 1-1, scale-shaped graphite having an average particle diameter of 18 μm (the average particle diameter of the scale-shaped graphite to the secondary particle of $LiMn_2O_4$:0.9 times), and polyvinylidene fluoride were mixed at a composition ratio of 87:8:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 104 μm, and the length of the positive electrode was 348 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 360 cm.

EXAMPLE 1-5

As shown in Table 1, in Example 1-5, a battery was manufactured in the following manner. The same lithium manganate powder as that in the Example 1-1, scale-shaped graphite having an average particle diameter of 18 μm (the average particle diameter of the scale-shaped graphite to the secondary particle of $LiMn_2Mn_2O_4$:0.9 times), and polyvinylidene fluoride were mixed at a composition ratio of 79:16:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 115 μm, and the length of the positive electrode was 336 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 348 cm.

EXAMPLE 1-6

As shown in Table 1, in Example 1-6, a battery was manufactured in the following manner. The same lithium manganate powder as that in the Example 1-1, scale-shaped graphite having an average particle diameter of 18 μm (the average particle diameter of the scale-shaped graphite to the secondary particle of $LiMn_2O_4$:0.9 times), Ketjen black (KB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-7

As shown in Table 1, in Example 1-7, a battery was manufactured in the following manner. The same lithium manganate powder as that in the Example 1-1, scale-shaped graphite having an average particle diameter of 2 μm (the average particle diameter of the scale-shaped graphite to the secondary particle of $LiMn_2O_4$:0.1 times), ketjen black (KB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-8

As shown in Table 1, in Example 1-8, a battery was manufactured in the following manner. The same lithium manganate powder as that in the Example 1-1, scale-shaped graphite having an average particle diameter of 4 μm (the average particle diameter of the scale-shaped graphite to the secondary particle of $LiMn_2O_4$:0.2 times), ketjen black (KB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-9

As shown in Table 1, in Example 1-9, a battery was manufactured in the following manner. The same lithium manganate powder as that in the Example 1-1, scale-shaped graphite having an average particle diameter of 10 μm (the average particle diameter of the scale-shaped graphite to the secondary particle of $LiMn_2O_4$:0.5 times), ketjen black (KB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-10

As shown in Table 1, in Example 1-10, a battery was manufactured in the following manner. The same lithium manganate powder as that in the Example 1-1, scale-shaped graphite having an average particle diameter of 16 μm (the average particle diameter of the scale-shaped graphite to the secondary particle of $LiMn_2O_4$:0.8 times), ketjen black (KB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m$^2$, the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-11

As shown in Table 1, in Example 1-11, a battery was manufactured in the following manner. The same lithium manganate power as that in the Example 1-1, scale-shaped graphite having an average particle diameter of 10 μm (the average particle diameter of the scale-shaped graphite to the secondary particle of $LiMn_2O_4$:0.5 times), acetylene black (AB) and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m$^2$, the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-12

As shown in the following Table 1, in Example 1-12, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.55, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m$^2$, the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-13

As shown in the following Table 1, in Example 1-13, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.58, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m$^2$, the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-14

As shown in the following Table 1, in Example 1-14, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.60, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m$^2$, the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-15

As shown in the following Table 1, in Example 1-15, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.61, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, MCMB was used as the negative electrode active material. The thickness (which did not include the thickness of the collector) of the negative electrode active material mixture layer (active material applied portion) W4 was 79 μm, and the length thereof was 354 cm.

EXAMPLE 1-16

As shown in the following Table 1, in Example 1-16, a battery was manufactured in the following manner. The same lithium manganate powder as that in the Example 1-1, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 83:10:2:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, amorphous carbon was used as the negative electrode active material. The thickness (which did not include the thickness of the collector) of the negative electrode active material mixture layer (active material applied portion) W4 was 79 μm, and the length thereof was 354 cm.

EXAMPLES 1-16-2 TO 1-16-5

As shown in Table 1, in Examples 1-16-2 to 1-16-5, each battery was manufactured in the same manner as the Example 1-16 except that the Li/Mn ratio of lithium manganate was 0.55, 0.58, 0.60 or 0.61.

EXAMPLE 1-17

As shown in Table 1, in Example 1-17, a battery was manufactured in the following manner. The same lithium manganate powder as that in the Example 1-1, scale-shaped graphite having an average particle diameter of 10 μm (the average particle diameter of the scale-shaped graphite to the secondary particle of $LiMn_2O_4$:0.5 times), and polyvinylidene fluoride were mixed at a composition ratio of 83:12:5 at weight %. The amount of application of the lithium manganate of the positive electrode active material mixture layer (active material applied portion) W2 per one side surface of the collector was 120 g/m², the thickness (which did not include the thickness of the collector) of the positive electrode active material mixture layer (active material applied portion) W2 was 109 μm, and the length of the positive electrode was 342 cm. Meanwhile, in the negative electrode, amorphous carbon was used as the negative electrode active material. The thickness (which did not include the thickness of the collector) of the negative electrode active material mixture layer (active material applied portion) W4 was 79 μm, and the length thereof was 354 cm.

EXAMPLES 1-17-2 TO 1-17-5

As shown in Table 1, in Examples 1-17-2 to 1-17-5, each battery was manufactured in the same manner as the Example 1-17 except that the Li/Mn ratio of lithium manganate was 0.55, 0.58, 0.60 or 0.61.

(Control 1-1)

As shown in Table 1, in Control 1-1, a battery was manufactured in the same manner as the Example 1-1 except that the amount of application of lithium manganate was 75 g/m², the thickness (which did not include the thickness of the collector) of the positive electrode active material mixture layer (active material applied portion) was 68 μm, the length of the positive electrode was 450 cm, the thickness (which did not include the thickness of the collector) of the negative electrode active material mixture layer (active material applied portion) was 50 μm, and the length of the negative electrode was 462 cm.

(Control 1-2)

As shown in Table 1, in Control 1-2, a battery was manufactured in the same manner as the Example 1-1 except that the amount of application of lithium manganate was 165 g/m², the thickness (which did not include the thickness of the collector) of the positive electrode active material mixture layer (active material applied portion) was 150 μm, the length of the positive electrode was 276 cm, the thickness (which did not include the thickness of the collector) of the negative electrode active material mixture layer (active material applied portion) was 109 μm, and the length of the negative electrode was 288 cm.

(Control 1-3)

As shown in Table 1, in Control 1-3, a battery was manufactured in the following manner. The same lithium manganate powder as that in the Example 1-1, scale-shaped graphite having an average particle diameter of 18 μm (the average particle diameter of the scale-shaped graphite to the secondary particle of $LiMn_2O_4$:0.9 times), and polyvinylidene fluoride were mixed at a composition ratio of 88:7:5 at weight %. The amount of application of the lithium manganate of the positive electrode active material mixture layer (active material applied portion) per one side surface of the collector was 120 g/m², the thickness (which did not include the thickness of the collector) of the positive electrode active material mixture layer (active material applied portion) was 103 μm, and the length of the positive electrode was 349 cm. Meanwhile, in the negative electrode, MCMB was used as the negative electrode active material. The thickness (which did not include the thickness of the collector) of the negative electrode active material mixture layer (active material applied portion) was 80 μm, and the length thereof was 361 cm.

(Control 1-4)

As shown in Table 1, in Control 1-4, a battery was manufactured in the following manner. The same lithium manganate powder as that in the Example 1-1, scale-shaped graphite having an average particle diameter of 18 μm (the average particle diameter of the scale-shaped graphite to the secondary particle of $LiMn_2O_4$:0.9 times), and polyvinylidene fluoride were mixed at a composition ratio of 78:17:5 at weight %. The amount of application of the lithium manganate of the positive electrode active material mixture layer (active material applied portion) per one side surface of the collector was 120 g/m², the thickness (which did not include the thickness of the collector) of the positive electrode active material mixture layer (active material applied portion) was 116 μm, and the length of the positive electrode was 334 cm. Meanwhile, in the negative electrode, MCMB was used as the negative electrode active material. The thickness (which did not include the thickness of the collector) of the negative electrode active material mixture layer (active material applied portion) was 80 μm, and the length thereof was 346 cm.

[Test & Evaluation]

Next, regarding the respective batteries of the Examples and Controls manufactured in the above manners, a series of tests were conducted in the following manner.

After each of the respective batteries of the Examples and the Controls was charged, it was discharged so that its discharging capacity was measured. The charging conditions were set on a constant voltage of 4.2V, a limiting current of 5 A, and a charging time of 3.5 hours. The discharging conditions were set on a constant current of 5 A and a final voltage of 2.7V.

Also, the discharging power of each battery which was put in a charged state was measured under the above conditions. The measuring conditions were as follows: Each voltage of the fifth second at each discharging current of 1 A, 3 A, and 6 A was read and plotted on the vertical axis to the current value of the horizontal axis, where a straight line in which an approximate collinear was performed by three points reached a final voltage 2.7V, the product of the current value by the 2.7V was calculated as the initial power for each battery.

Further, after each battery was repeated 100 cycles of charging and discharging on the above conditions, the power (capacity) of the 100th cycle was measured. Then, a percentage of the power of the 100th cycle to the initial power (hereinafter, called "power retaining percentage") was calculated. It goes without saying that, the higher the power retaining percentage is, the more excellent the life characteristic is.

The measurements of these charging, discharging and power were conducted in the atmosphere of an environmental temperature of 25±1° C.

Thereafter, each battery manufactured was continuously charged at the room temperature with a constant current of 20 A, and its behavior was observed. The test results are shown in the following Table 2. Such a phenomenon of gas discharging constituted with volatile material of electrolytic solution occurred after the cleavage valve was cleaved. In order to compare the magnitudes of the respective gas dischargings of the batteries with one anther, the temperatures of battery surfaces just after the phenomena occurred were measured. Also, presence/absence of deformation in each battery container was observed. Incidentally, in Table 2, a circle mark indicates a battery whose battery container was not deformed at all, a delta mark indicates a battery whose battery container was slightly deformed, and a mark "X" indicates a battery whose battery container was largely deformed.

TABLE 2

| | POWER | | | SAFETY | |
| --- | --- | --- | --- | --- | --- |
| | CAPACITY (Ah) | INITIAL (W) | POWER RETAINING PERCENTAGE (%) | BATTERY SURFACE TEMPERATURE (° C.) | BATTERY APPEARANCE |
| Example 1-1 | 5.38 | 770 | 90 | 220 | Δ |
| Example 1-2 | 6.36 | 750 | 90 | 180 | ○ |
| Example 1-2-2 | 6.36 | 750 | 93 | 180 | ○ |
| Example 1-2-3 | 6.24 | 750 | 94 | 180 | ○ |
| Example 1-2-4 | 6.24 | 750 | 95 | 180 | ○ |
| Example 1-2-5 | 5.76 | 750 | 95 | 180 | ○ |
| Example 1-3 | 6.99 | 710 | 90 | 150 | ○ |
| Example 1-4 | 6.47 | 715 | 88 | 170 | ○ |
| Example 1-5 | 6.25 | 730 | 92 | 190 | ○ |
| Example 1-6 | 6.36 | 760 | 90 | 180 | ○ |
| Example 1-7 | 6.36 | 780 | 90 | 210 | Δ |
| Example 1-8 | 6.36 | 780 | 90 | 190 | ○ |
| Example 1-9 | 6.36 | 770 | 90 | 180 | ○ |
| Example 1-10 | 6.36 | 770 | 90 | 170 | ○ |
| Example 1-11 | 6.36 | 800 | 91 | 180 | ○ |
| Example 1-12 | 6.36 | 800 | 94 | 180 | ○ |
| Example 1-13 | 6.24 | 800 | 95 | 180 | ○ |
| Example 1-14 | 6.24 | 800 | 96 | 180 | ○ |
| Example 1-15 | 5.76 | 800 | 96 | 180 | ○ |
| Example 1-16 | 5.94 | 820 | 91 | 120 | ○ |
| Example 1-16-2 | 5.94 | 820 | 94 | 120 | ○ |
| Example 1-16-3 | 5.82 | 820 | 95 | 120 | ○ |
| Example 1-16-4 | 5.82 | 820 | 96 | 120 | ○ |
| Example 1-16-5 | 5.37 | 820 | 96 | 120 | ○ |
| Example 1-17 | 5.94 | 790 | 91 | 120 | ○ |
| Example 1-17-2 | 5.94 | 790 | 94 | 120 | ○ |
| Example 1-17-3 | 5.82 | 790 | 95 | 120 | ○ |
| Example 1-17-4 | 5.82 | 790 | 96 | 120 | ○ |
| Example 1-17-5 | 5.37 | 790 | 96 | 120 | ○ |
| Control 1-1 | 5.23 | 790 | 90 | 330 | X |
| Control 1-2 | 7.06 | 630 | 90 | 150 | ○ |
| Control 1-3 | 6.49 | 645 | 84 | 150 | ○ |
| Control 1-4 | 6.21 | 740 | 92 | 310 | X |

As shown in Table 2, in each battery of Examples 1-1 to 1-5, high capacity and high power were obtained, and battery behavior at a time of continuous charging was calm. At this time, the surface temperature of each battery was in the range of from 150° C. to 220° C. at most. In the battery of the Control 1-1 where the amount of application of lithium manganate was below 80 g/m$^2$, high capacity and high power were not obtained and the battery behavior during continuous charging was violent followed by deformation of the battery. The surface temperature of the battery exceeded 300° C. On the contrary, in the battery of Control 1-2 where the amount of application of lithium manganate was above 160 g/m$^2$, the battery behavior during a continuous charging was calm, but according to lowering of the power, the results obtained were not suitable as a battery for an electric vehicle. Like the above, in the battery of Control 1-3, the amount of graphite in the positive electrode conductive material was below 8 weight %, which resulted in lowering of the power. On the other hand, in the battery of Control 1-4 where the amount of graphite in the positive electrode conductive material exceeded 16 weight %, high capacity and high power were obtained, but the battery behavior during continuous charging was violent, and the battery surface temperature resulted in 310° C.

In each battery of Examples 1-6 to 1-16-5 where graphite and amorphous carbon were mixed and used as the positive electrode conductive material, high power could be achieved. Among the batteries of the Examples 1-6 to 1-10 where ketjen black was used as the amorphous carbon, the batteries 1-8 to 1-10 where the ratio of the particle diameter of the conductive material graphite to the secondary particle diameter of the lithium manganate in the positive electrode active material was 0.2 to 0.8, higher power could be obtained. In the battery of Example 1-7 where the ratio of the particle diameter of the conductive material graphite to the secondary particle diameter of lithium manganate was below 0.2, the battery surface temperature during continuous charging was 210° C. which was slightly higher than that in each battery of the Examples 1-8 to 1-10.

In Examples 1-11 to 1-16-5 where the acetylene black was used as the amorphous carbon, higher power in each battery was obtained and the power retaining percentage after the 100th cycle of charging and discharging cycles was high.

In each battery of Examples 1-12 to 1-14, Examples 1-2-2 to 1-2-4, Examples 1-16-2 to 1-16-4, and Examples 1-17-2 to 1-17-4, where Li/Mn ratio of lithium manganate was 0.55 or more, its power retaining percentage was very high. However, in each battery of Example 1-15, Example 1-2-5, Example 1-16-5, and Example 1-17-5, where Li/Mn ratio of lithium manganate was above 0.60, lowering of capacity was caused. Therefore, it is found that the Li/Mn ratio is preferably in the range of from 0.55 to 0.60.

In each battery of Example 1-16, Examples 1-16-2 to 1-16-5, Example 1-17, and Examples 1-17-2 to 1-17-5, where amorphous carbon was used the negative electrode, a remarkably high power, a remarkably power retaining percentage and a lowermost battery surface temperature during continuous charging could be obtained. Accordingly, each battery of these Examples 1-16, 1-16-2 to 1-16-5, 1-17, and 1-17-2 to 1-17-5 was one which has a high capacity, a high power and an excellent safety and which was well balanced generally.

As mentioned above, the cylindrical lithium-ion battery 20 according to the present embodiment is a battery whose behavior is remarkably calm even when it is put in an abnormal state and which has an excellent safety. Thus, a battery having a high capacity and a high power, and whose safety is considerably high is suitable for a power supply for HEV.

(Second Embodiment)

Next, a second embodiment where the present invention has been applied to a cylindrical lithium-ion battery for EV will be explained.

(Positive Electrode)

Figure 2:
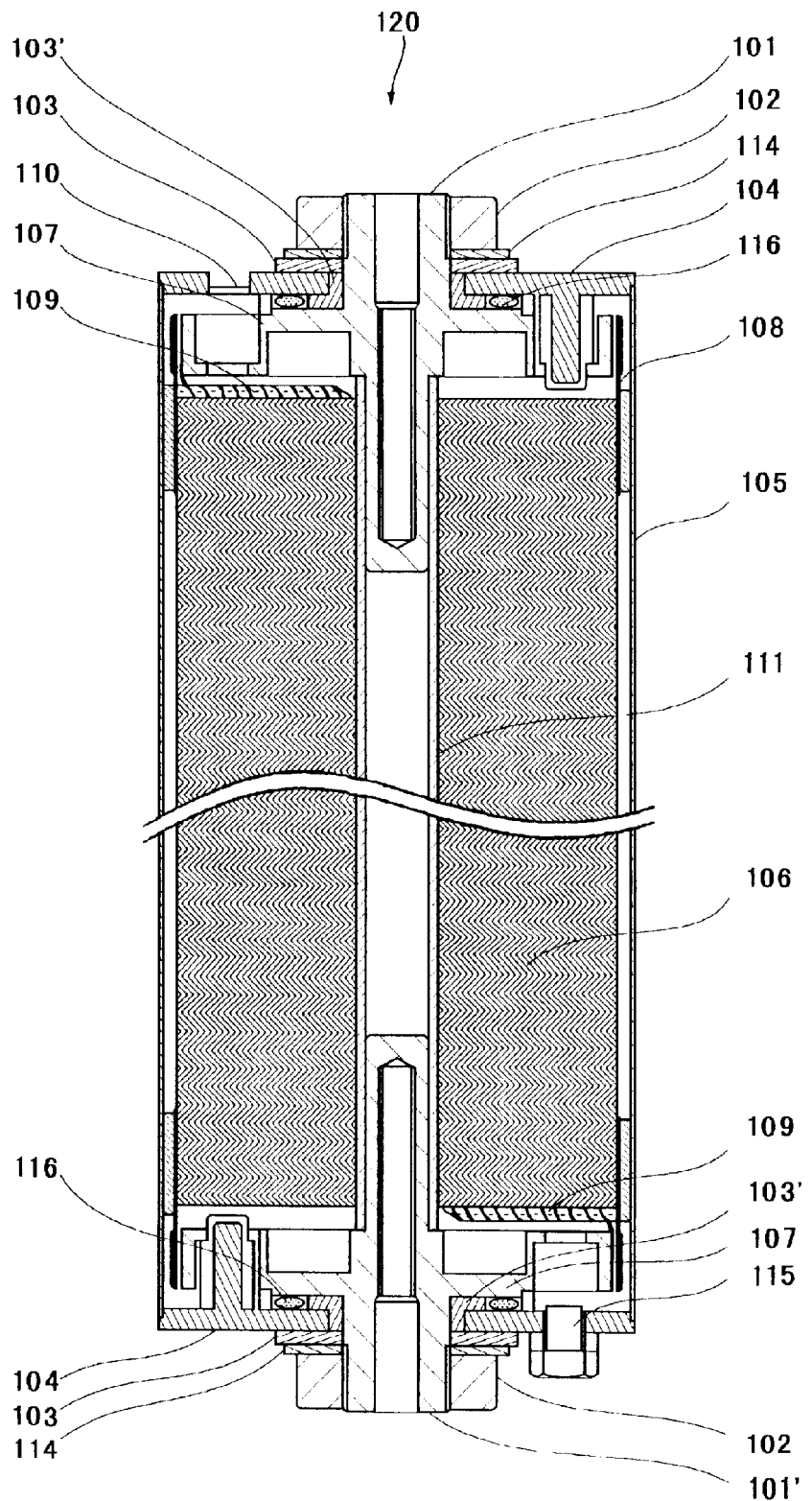
FIG. 2 is a sectional view of a cylindrical lithium-ion secondary battery of a second embodiment to which the present invention is applicable.

As shown in FIG. 2, a powdered lithium manganate ($LiMn_2O_4$) serving as a positive electrode active material, a predetermined carbon serving as conductive material, which is described later, and a polyvinylidene fluoride (PVDF) as a binder are mixed at a predetermined ratio, the resultant mixture is added and mixed with N-methyl-2-pyrrolidone (NMP) as dispersion solvent to produce slurry. The slurry thus produced is applied to both surfaces of an aluminum foil (positive electrode collector) having a thickness of 20 μm. At this time, a non-coated portion with a width of 50 mm is left on one side edge, in a longitudinal direction, of the positive electrode. Thereafter, the aluminum foil W1 thus applied with the mixture is dried, pressed and cut to produce a positive electrode having a width of 300 mm, a predetermined length and a predetermined thickness of the active material mixture applied portion. The apparent density of the positive electrode active material mixture layer is set to 2.65 g/cm$^3$. The non-coated portion is formed with notched portions, and the remaining portion thereof serves as positive electrode lead pieces. The distance or interval between the adjacent positive electrode lead pieces is set to 50 mm and the width of each positive electrode lead piece is set to 10 mm.

(Negative Electrode)

92 weight parts of a predetermined carbon powder from/ in which lithium ions can be released/occluded through charging/discharging is added with 8 weight parts of a polyvinylidene fluoride as a binder, and is further added and mixed with N-methyl-2-pyrrolidone as dispersion solvent to produce slurry. The slurry thus produced is applied to both surfaces of a rolled copper foil (negative electrode collector) having a thickness of 10 μm. At this time, a non-coated portion with a width of 50 mm is left on one side edge, in a longitudinal direction, of the negative electrode. Thereafter, the copper foil thus applied with the mixture is dried, pressed and cut to produce a negative electrode having a width of 305 mm, a predetermined length and a predetermined thickness of the active material mixture applied portion described later. The negative electrode is pressed such that the porosity of the negative electrode mixture layer is set to about 35%. The non-coated portion is formed with notched portions like the case of the positive electrode, and the remaining portion thereof serves as negative electrode lead pieces. The distance or interval between the adjacent negative electrode lead pieces is set to 50 mm and the width of each positive electrode lead piece is set to 10 mm.

(Manufacture of Battery)

The positive electrode and the negative electrode manufactured in the above manner are wound together with a separator made of polyethylene and having a width of 310 mm and a thickness of 40 μm such that both the electrodes do not come in direct contact with each other. At this time, lead pieces 109 of the positive electrode and the negative electrode are respectively positioned at both end faces opposed to each other with respect to a winding group 106. Also, the lengths of the positive electrode, the negative electrode and the separator are adjusted to set the diameter of the winding group 106 to 65±0.1 mm.

After all the lead pieces 109 extending from the positive electrode are deformed to be collected about and brought in contact with a peripheral face of a flange portion 107 extended integrally from a periphery of an electrode strut (positive electrode external terminal 101) positioned on an extension line of a shaft rod 111, the lead pieces 109 and the peripheral face of the flange portion 107 are welded to each other in a ultrasonic manner so that the lead pieces 109 are connected to the peripheral face of the flange portion 107. Meanwhile, connecting operation between a negative electrode external terminal 101' and the lead pieces 109 extending from the negative electrode is performed like the connecting operation between the positive electrode external terminal 101 and the lead pieces 109 extending from the positive electrode.

Thereafter, insulating covering 108 is applied on the entire circumferential surfaces of the flange portions 107 of the positive electrode external terminal 101 and the negative electrode external terminal 101'. This insulating covering 108 is applied to the entire outer peripheral surface of the winding group 106. An adhesive tape comprising a base member made of polyimide and adhesive agent made of hexameta-acrylate and applied to one surface thereof is used for the insulating covering 108. This adhesive tape is wound several times from the peripheral surface of the flange portion 107 to the outer peripheral surface of the winding group 106, thereby forming the insulating covering 108. The number of windings is adjusted such that the maximum diameter portion of the winding group 106 is a portion where the insulating covering 108 exists. The maximum diameter is set to be slightly smaller than an inner diameter of a battery container 105, and the winding group 106 is inserted into the battery container 105 made of steel and nickel-plated. The outer diameter of the battery container 105 is 67 mm and the inner diameter thereof is 66 mm.

Then, second ceramic washers 103' are respectively fitted on the pole stud whose distal end constitutes the positive electrode external terminal 101 and the pole stud whose distal end constitutes the negative electrode external terminal 101'. Each second ceramic washer 103' is made of alumina and has a portion abutting on a back face of a disk-shaped battery lid 104, the abutting portion having a thickness of 2 mm, an inner diameter of 16 mm and an outer diameter of 25 mm. Also, alumina-made first planer ceramic washers 103 are respectively placed on the battery lids 104, and the positive electrode external terminal 101 and the negative electrode external terminal 101' are respectively inserted into the first ceramic washers 103. Each first planer ceramic washer 103 has a thickness of 2 mm, an inner diameter of 16 mm and an outer diameter of 28 mm. Then, peripheral faces of the battery lids 104 are fitted to openings of the battery container 105 and the entire contacting portion between the lids 104 and the battery container 105 is laser-welded. At this time, the positive electrode external terminal 101 and the negative electrode external terminal 101' project outside the battery lids 104 through holes formed at centers of the battery lids 104. The first ceramic washer 103 and a metal washer 114 which is smoother than the bottom face of a metal nut 102 are fitted on each of the positive electrode external terminal 101 and the negative electrode external terminal 101' in this order. Incidentally, a cleavage valve 110 which cleaves according to an increase in battery internal pressure is equipped with one of the battery lids 104. The cleavage valve 110 is set to cleaving pressure of $1.3 \times 10^6$ to $1.8 \times 10^6$ Pa (130 to 180 N/cm$^2$).

Next, the nuts 102 are respectively screwed to the positive electrode external terminal 101 and the negative electrode external terminal 101', and the battery lids 104 are fastened between the flange portions 107 and the nuts 102 via the second ceramic washers 103', the first ceramic washers 103 and the metal washers 114. A fastening torque value at this time is set to about 7 Nm. Incidentally, the metal washers 114 were not rotated until the fastening work was completed. In this state, electricity generating elements inside the battery container 105 are sealed from the outside by compression of O-rings 116 which are made of rubber (EPDM) and are interposed between the back face of the battery lid 104 and the flange portion 107.

Thereafter, a predetermined amount of non-aqueous electrolytic solution is injected to the battery container 105 from a injecting port 115 provided at the battery lid 104, and the cylindrical lithium-ion battery 120 is completed by sealing the injecting port 115.

The non-aqueous electrolytic solution is prepared previously in the following manner: A lithium hexafluorophosphate (LiPF$_6$) is dissolved at 1 mole/liter into mixed solution of ethylene carbonate, dimethyl carbonate and diethyl carbonate at a volume ratio of 1:1:1. Incidentally, the cylindrical lithium-ion battery 120 is not provided with a current shutting-off or reducing mechanism, for example, such as a PTC (Positive Temperature Coefficient) element or the like, which shuts off or reduces current according to an increase in battery temperature in the battery container 105.

Next, Examples of the cylindrical lithium-ion battery 120 manufactured according to the present embodiment will be explained. Incidentally, batteries of Controls manufactured for making a comparison with the batteries of Examples will also be explained below.

EXAMPLE 2-1

As shown in the following table 3, in Example 2-1, a battery was manufactured in the following manner. Lithium manganate (LiMn$_2$O$_4$) powder where the primary particle diameter was about 1 to 2 $\mu$m, the secondary particle diameter was about 20 $\mu$m, the atom ratio (Li/Mn ratio) of Li to Mn was 0.52, scale-shaped graphite having an average particle diameter of 18 $\mu$m, and polyvinylidene fluoride were mixed at a composition ratio of 90:5:5 at weight %. The amount of application of the lithium manganate of the positive electrode active material mixture layer (active material applied portion) per one side surface of the collector was 270 g/m$^2$, the thickness (which did not include the thickness of the collector) of the positive electrode active material mixture layer (active material applied portion) was 226 $\mu$m, and the length of the positive electrode was 615 cm. The average particle diameter of the scale-shaped graphite to secondary particle diameter of the LiMn$_2$O$_4$ was 0.9 times. Meanwhile, in the negative electrode, MCMB which is mesophase system spherical graphite was used as the negative electrode active material. The thickness (which did not include the thickness of the collector) of the negative electrode active material mixture layer (active material applied portion) was 150 $\mu$m, and the length thereof was 633 cm. Incidentally, the average particle diameter of the scale-shaped graphite can be adjusted by screening.

TABLE 3

| | | POSITIVE ELECTRODE | | | | | | NEGATIVE ELECTRODE | | |
|---|---|---|---|---|---|---|---|---|---|---|
| | | appln. | | | conductive | | graphite particle | | | |
| | Li/Mn ratio | Amount (g/m$^2$) | Tp (μm) | Lp (cm) | material amount (wt %) | conductive material | | diameter (to LiMn$_2$O$_4$) | active material | Tn (μm) | Ln (cm) |
| Example 2-1 | 0.52 | 270 | 226 | 615 | 5 | G | — | 0.9 | MCMB | 150 | 633 |
| Example 2-2 | 0.52 | 300 | 252 | 565 | 5 | G | — | 0.9 | MCMB | 166 | 583 |
| Example 2-2-2 | 0.55 | 300 | 252 | 565 | 5 | G | — | 0.9 | MCMB | 166 | 583 |
| Example 2-2-3 | 0.58 | 300 | 252 | 565 | 5 | G | — | 0.9 | MCMB | 166 | 583 |
| Example 2-2-4 | 0.60 | 300 | 252 | 565 | 5 | G | — | 0.9 | MCMB | 166 | 583 |
| Example 2-2-5 | 0.61 | 300 | 252 | 565 | 5 | G | — | 0.9 | MCMB | 166 | 583 |
| Example 2-3 | 0.52 | 330 | 277 | 523 | 5 | G | — | 0.9 | MCMB | 183 | 541 |
| Example 2-4 | 0.52 | 300 | 252 | 565 | 3 | G | — | 0.9 | MCMB | 166 | 583 |
| Example 2-5 | 0.52 | 300 | 260 | 556 | 7 | G | — | 0.9 | MCMB | 166 | 574 |
| Example 2-6 | 0.52 | 300 | 252 | 565 | 5 | G | KB | 0.9 | MCMB | 166 | 583 |
| Example 2-7 | 0.52 | 300 | 252 | 565 | 5 | G | KB | 0.1 | MCMB | 166 | 583 |
| Example 2-8 | 0.52 | 300 | 252 | 565 | 5 | G | KB | 0.2 | MCMB | 166 | 583 |
| Example 2-9 | 0.52 | 300 | 252 | 565 | 5 | G | KB | 0.5 | MCMB | 166 | 583 |
| Example 2-10 | 0.52 | 300 | 252 | 565 | 5 | G | KB | 0.8 | MCMB | 166 | 583 |
| Example 2-11 | 0.52 | 300 | 252 | 565 | 5 | G | AB | 0.5 | MCMB | 166 | 583 |
| Example 2-12 | 0.55 | 300 | 252 | 565 | 5 | G | AB | 0.5 | MCMB | 166 | 583 |
| Example 2-13 | 0.58 | 300 | 252 | 565 | 5 | G | AB | 0.5 | MCMB | 166 | 583 |
| Example 2-14 | 0.60 | 300 | 252 | 565 | 5 | G | AB | 0.5 | MCMB | 166 | 583 |
| Example 2-15 | 0.61 | 300 | 252 | 565 | 5 | G | AB | 0.5 | MCMB | 166 | 583 |
| Example 2-16 | 0.52 | 300 | 252 | 605 | 5 | G | AB | 0.5 | AC | 133 | 623 |
| Example 2-16-2 | 0.55 | 300 | 252 | 605 | 5 | G | AB | 0.5 | AC | 133 | 623 |
| Example 2-16-3 | 0.58 | 300 | 252 | 605 | 5 | G | AB | 0.5 | AC | 133 | 623 |
| Example 2-16-4 | 0.60 | 300 | 252 | 605 | 5 | G | AB | 0.5 | AC | 133 | 623 |
| Example 2-16-5 | 0.61 | 300 | 252 | 605 | 5 | G | AB | 0.5 | AC | 133 | 623 |
| Example 2-17 | 0.52 | 300 | 252 | 605 | 5 | G | — | 0.5 | AC | 133 | 623 |
| Example 2-17-2 | 0.55 | 300 | 252 | 605 | 5 | G | — | 0.5 | AC | 133 | 623 |
| Example 2-17-3 | 0.58 | 300 | 252 | 605 | 5 | G | — | 0.5 | AC | 133 | 623 |
| Example 2-17-4 | 0.60 | 300 | 252 | 605 | 5 | G | — | 0.5 | AC | 133 | 623 |
| Example 2-17-5 | 0.61 | 300 | 252 | 605 | 5 | G | — | 0.5 | AC | 133 | 623 |
| Control 2-1 | 0.52 | 260 | 218 | 633 | 5 | G | — | 0.9 | MCMB | 144 | 651 |
| Control 2-2 | 0.52 | 340 | 285 | 511 | 5 | G | — | 0.9 | MCMB | 189 | 529 |
| Control 2-3 | 0.52 | 300 | 249 | 568 | 2 | G | — | 0.9 | MCMB | 166 | 586 |
| Control 2-4 | 0.52 | 300 | 263 | 553 | 8 | G | — | 0.9 | MCMB | 166 | 571 |

Incidentally, in the electrodes manufactured, the length of the negative electrode was set to be longer than that of the positive electrode by 18 cm such that, when wounded, the positive electrode did not protrude at the innermost layer of the winding from the negative electrode in a winding direction and the positive electrode did not protrude at the outermost layer of the winding from the negative electrode in the winding direction. Also, the width of the negative electrode active material applied portion was set to be longer than that of the positive electrode active material applied portion by 5 mm such that the positive electrode active material applied portion did not protrude from the negative electrode active material applied portion in a direction perpendicular to the winding direction (which is the same in the following Examples and Controls).

EXAMPLE 2-2

As shown in Table 3, in Example 2-2, a battery was manufactured in the same manner as the Example 2-1 except that the amount of application of lithium manganate was 300 g/m$^2$, the thickness (which did not include the thickness of the collector) of the positive electrode active material mixture layer (active material applied portion) was 252 μm, the length of the positive electrode was 565 cm, the thickness (which did not include the thickness of the collector) of the negative electrode active material mixture layer (active material applied portion) was 166 μm, and the length of the negative electrode was 583 cm.

EXAMPLES 2-2-2 to 2-2-5

As shown in Table 3, in Examples 2-2-2 to 2-2-5, each battery was manufactured in the same manner as the Example 2-2 except that the Li/Mn ratio of lithium manganate was 0.55, 0.58, 0.60 or 0.61.

EXAMPLE 2-3

As shown in Table 3, in Example 2-3, a battery was manufactured in the same manner as the Example 2-1 except that the amount of application of lithium manganate was 330 g/m$^2$, the thickness (which did not include the thickness of the collector) of the positive electrode active material mixture layer (active material applied portion) was 277 μm, the length of the positive electrode was 523 cm, the thickness (which did not include the thickness of the collector) of the negative electrode active material mixture layer (active material applied portion) was 183 μm, and the length of the negative electrode was 541 cm.

EXAMPLE 2-4

As shown in Table 3, in Example 2-4, a battery was manufactured in the following manner. The same lithium manganate powder as that in the Example 2-1, scale-shaped graphite having an average particle diameter of 18 μm (the average particle diameter of the scale-shaped graphite to the secondary particle of LiMn$_2$O$_4$:0.9 times), and polyvinylidene fluoride were mixed at a composition ratio of 90:3:7 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-5

As shown in Table 3, in Example 2-5, a battery was manufactured in the same manner. The same lithium manganate powder as that in the Example 2-1, scale-shaped graphite having an average particle diameter of 18 μm (the average particle diameter of the scale-shaped graphite to the secondary particle of $LiMn_2O$:0.9 times), and polyvinylidene fluoride were mixed at a composition ratio of 90:7:3 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 260 μm, and the length of the positive electrode was 556 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 574 cm.

EXAMPLE 2-6

As shown in Table 3, in Example 2-6, a battery was manufactured in the following manner. The same lithium manganate powder as that in the Example 2-1, scale-shaped graphite having an average particle diameter of 18 μm (the average particle diameter of the scale-shaped graphite to the secondary particle of $LiMn_2O_4$:0.9 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-7

As shown in Table 3, in Example 2-7, a battery was manufactured in the following manner. The same lithium manganate powder as that in the Example 2-1, scale-shaped graphite having an average particle diameter of 2 μm (the average particle diameter of the scale-shaped graphite to the secondary particle of $LiMn_2O_4$:0.1 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-8

As shown in Table 3, in Example 2-8, a battery was manufactured in the following manner. The same lithium manganate powder as that in the Example 2-1, scale-shaped graphite having an average particle diameter of 4 μm (the average particle diameter of the scale-shaped graphite to the secondary particle of $LiMn_2O_4$:0.2 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-9

As shown in Table 3, in Example 2-9, a battery was manufactured in the following manner. The same lithium manganate powder as that in the Example 2-1, scale-shaped graphite having an average particle diameter of 10 μm (the average particle diameter of the scale-shaped graphite to the secondary particle of $LiMn_2O_4$:0.5 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-10

As shown in Table 3, in Example 2-10, a battery was manufactured in the following manner. The same lithium manganate powder as that in the Example 2-1, scale-shaped graphite having an average particle diameter of 16 μm (the average particle diameter of the scale-shaped graphite to the secondary particle of $LiMn_2O_4$:0.8 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m$^2$, the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-11

As shown in Table 3, in Example 2-11, a battery was manufactured in the following manner. The same lithium manganate power as that in the Example 2-1, scale-shaped graphite having an average particle diameter of 10 μm (the average particle diameter of the scale-shaped graphite to the secondary particle of $LiMn_2O_4$:0.5 times), ketjen black (KB) and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-12

As shown in Table 3, in Example 2-12, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.55, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-13

As shown in Table 3, in Example 2-13, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.58, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-14

As shown in Table 3, in Example 2-14, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.60, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-15

As shown in Table 3, in Example 2-15, a battery was manufactured in the following manner. Lithium manganate ($LiMn_2O_4$) powder where the primary particle diameter was about 1 to 2 μm, the secondary particle diameter was about 20 μm, the atom ratio (Li/Mn ratio) of Li to Mn was 0.61, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 565 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 583 cm.

EXAMPLE 2-16

As shown in Table 3, in Example 2-16, a battery was manufactured in the following manner. The same lithium manganate powder as that in the Example 2-1, scale-shaped graphite having an average particle diameter of 10 μm (average particle diameter of scale-shaped graphite to the secondary particle diameter of $LiMn_2O_4$:0.5 times), acetylene black (AB), and polyvinylidene fluoride were mixed at a composition ratio of 90:4:1:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 605 cm. Meanwhile, in the negative electrode, amorphous carbon was used as the negative electrode active material. The thickness (which did not include the thickness of the collector) of the negative electrode active material mixture layer (active material applied portion) was 133 μm, and the length thereof was 623 cm.

EXAMPLES 2-16-2 TO 2-16-5

As shown in Table 3, in Examples 2-16-2 to 2-16-5, each battery was manufactured in the same manner as the Example 2-16 except that the Li/Mn ratio of lithium manganate was 0.55, 0.58, 0.60 or 0.61.

EXAMPLE 2-17

As shown in Table 3, in Example 2-17, a battery was manufactured in the following manner. The same lithium manganate powder as that in the Example 2-1, scale-shaped graphite having an average particle diameter of 10 μm (the average particle diameter of the scale-shaped graphite to the secondary particle of $LiMn_2O_4$:0.5 times), and polyvinylidene fluoride were mixed at a composition ratio of 90:5:5 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 252 μm, and the length of the positive electrode was 605 cm. Meanwhile, in the negative electrode, amorphous carbon was used as the negative electrode active material. The thickness (which did not include the thickness of the collector) of the negative electrode active material mixture layer (active material applied portion) was 133 μm, and the length thereof was 623 cm.

EXAMPLES 2-17-2 TO 2-17-5

As shown in Table 3, in Examples 2-17-2 to 2-17-5, each battery was manufactured in the same manner as the Example 2-17 except that the Li/Mn ratio of lithium manganate was 0.55, 0.58, 0.60 or 0.61.

(Control 2-1)

As shown in Table 3, in Control 2-1, a battery was manufactured in the same manner as the Example 2-1 except that the amount of application of lithium manganate was 260 g/m², the thickness (which did not include the thickness of the collector) of the positive electrode active material mixture layer (active material applied portion) was 218 μm, the length of the positive electrode was 633 cm, the thickness (which did not include the thickness of the collector) of the negative electrode active material mixture layer (active material applied portion) was 144 μm, and the length of the negative electrode was 651 cm.

(Control 2-2)

As shown in Table 3, in Control 2-2, a battery was manufactured in the same manner as the Example 2-1 except that the amount of application of lithium manganate was 340 g/m², the thickness (which did not include the thickness of the collector) of the positive electrode active material mixture layer (active material applied portion) was 285 μm, the length of the positive electrode was 511 cm, the thickness (which did not include the thickness of the collector) of the negative electrode active material mixture layer (active material applied portion) was 189 μm, and the length of the negative electrode was 529 cm.

(Control 2-3)

As shown in Table 3, in Control 2-3, a battery was manufactured in the following manner. The same lithium manganate powder as that in the Example 2-1, scale-shaped graphite having an average particle diameter of 18 μm (the average particle diameter of the scale-shaped graphite to the secondary particle of $LiMn_2O_4$:0.9 times), and polyvinylidene fluoride were mixed at a composition ratio of 91:2:7 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 249 μm, and the length of the positive electrode was 568 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 586 cm.

(Control 2-4)

As shown in Table 3, in Control 2-4, a battery was manufactured in the following manner. The same lithium manganate powder as that in the Example 2-1, scale-shaped graphite having an average particle diameter of 18 μm (the average particle diameter of the scale-shaped graphite to the secondary particle of $LiMn_2O_4$:0.9 times), and polyvinylidene fluoride were mixed at a composition ratio of 86:8:6 at weight %. The amount of application of the lithium manganate of the positive electrode active material mixture layer (active material applied portion) per one side surface of the collector was 300 g/m², the thickness (which did not include the thickness of the collector) of the positive electrode active material mixture layer (active material applied portion) was 263 μm, and the length of the positive electrode was 553 cm. Meanwhile, in the negative electrode, MCMB was used as the negative electrode active material. The thickness (which did not include the thickness of the collector) of the negative electrode active material mixture layer (active material applied portion) was 166 μm, and the length thereof was 571 cm.

[Test & Evaluation]

Next, regarding the respective batteries of the Examples and Controls manufactured in the above manners, a series of tests were conducted in the following manner.

After each of the respective batteries of the Examples and the Controls was charged, it was discharged so that its discharging capacity was measured. The charging conditions were set on a constant voltage of 4.2V, a limiting current of 80 A, and a charging time of 3.5 hours. The discharging conditions were set on a constant current of 20 A and a final voltage of 2.7V.

Also, the discharging power of each battery which was put in a charged state was measured under the above conditions. The measuring conditions were as follows: Each voltage of the fifth second at each discharging current of 20 A, 40 A, and 80 A was read and plotted on the vertical axis to the current value of the horizontal axis, where a straight line in which an approximate collinear was performed by three points reached a final voltage 2.7V, the product of the current value by the 2.7V was calculated as the initial power for each battery.

Further, after each battery was repeated 100 cycles of charging and discharging on the above conditions, the power (capacity) of the 100th cycle was measured. Then, a percentage of the power of the 100th cycle to the initial power (hereinafter, called "power retaining percentage") was calculated.

The measurements of these charging, discharging and power were conducted in the atmosphere of an environmental temperature of 25±1° C.

Thereafter, each battery manufactured was continuously charged at the room temperature with a constant current of 80 A, and its behavior was observed. The test results are shown in the following Table 4. Such a phenomenon of gas discharging constituted with volatile material of electrolytic solution occurred after the cleavage valve was cleaved. In order to compare the magnitudes of the respective gas dischargings of the batteries with one anther, the temperatures of battery surfaces just after the phenomena occurred in the batteries were measured. Also, presence/absence of deformation in each battery container was observed.

Incidentally, in Table 4, a circle mark indicates a battery whose battery container was not deformed at all, a delta mark indicates a battery whose battery container was slightly deformed, and a mark "X" indicates a battery whose battery container was largely deformed.

TABLE 4

|  | CAPACITY (Ah) | POWER | | SAFETY | |
|---|---|---|---|---|---|
|  |  | INITIAL (W) | POWER RETAINING PERCENTAGE (%) | BATTERY SURFACE TEMPERATURE (° C.) | BATTERY APPEARANCE |
| Example 2-1 | 92.4 | 3850 | 90 | 210 | Δ |
| Example 2-2 | 94.3 | 3750 | 90 | 170 | ○ |
| Example 2-2-2 | 94.3 | 3750 | 93 | 170 | ○ |
| Example 2-2-3 | 92.4 | 3750 | 94 | 170 | ○ |
| Example 2-2-4 | 92.4 | 3750 | 95 | 170 | ○ |
| Example 2-2-5 | 85.1 | 3750 | 95 | 170 | ○ |
| Example 2-3 | 96.0 | 3550 | 90 | 140 | ○ |
| Example 2-4 | 94.3 | 3575 | 88 | 160 | ○ |
| Example 2-5 | 92.8 | 3650 | 92 | 180 | ○ |
| Example 2-6 | 94.3 | 3800 | 90 | 170 | ○ |
| Example 2-7 | 94.3 | 3900 | 90 | 200 | Δ |
| Example 2-8 | 94.3 | 3900 | 90 | 180 | ○ |
| Example 2-9 | 94.3 | 3850 | 90 | 170 | ○ |
| Example 2-10 | 94.3 | 3850 | 90 | 160 | ○ |
| Example 2-11 | 94.3 | 4000 | 91 | 170 | ○ |
| Example 2-12 | 94.3 | 4000 | 94 | 170 | ○ |
| Example 2-13 | 92.4 | 4000 | 95 | 170 | ○ |
| Example 2-14 | 92.4 | 4000 | 96 | 170 | ○ |
| Example 2-15 | 85.1 | 4000 | 96 | 170 | ○ |
| Example 2-16 | 93.1 | 4100 | 91 | 110 | ○ |
| Example 2-16-2 | 93.1 | 4100 | 94 | 110 | ○ |
| Example 2-16-3 | 91.3 | 4100 | 95 | 110 | ○ |
| Example 2-16-4 | 91.3 | 4100 | 96 | 110 | ○ |
| Example 2-16-5 | 84.1 | 4100 | 96 | 110 | ○ |
| Example 2-17 | 93.1 | 3950 | 91 | 110 | ○ |
| Example 2-17-2 | 93.1 | 3950 | 94 | 110 | ○ |
| Example 2-17-3 | 91.3 | 3950 | 95 | 110 | ○ |
| Example 2-17-4 | 91.3 | 3950 | 96 | 110 | ○ |
| Example 2-17-5 | 84.1 | 3950 | 96 | 110 | ○ |
| Control 2-1 | 91.5 | 3950 | 90 | 320 | X |
| Control 2-2 | 96.6 | 3150 | 90 | 140 | ○ |
| Control 2-3 | 94.8 | 3225 | 84 | 140 | ○ |
| Control 2-4 | 92.3 | 3700 | 92 | 300 | X |

As shown in Table 4, in Examples 2-1 to 2-5, high capacity and high power of each battery could be obtained, and battery behavior thereof at a time of continuous charging was calm. At this time, the surface temperature of each battery was in the range of from 140° C. to 210° C. On the other hand, in the battery of the Control 2-1 where the amount of application of lithium manganate was below 270 g/m², high capacity and high power were not obtained and the battery behavior during continuous charging was violent followed by deformation of the battery. The surface temperature of the battery exceeded 300° C. On the contrary, in the battery of Control 2-2 where the amount of application of lithium manganate was above 330 g/m², the battery behavior during a continuous charging was calm, but according to lowering of the power, the results obtained were not suitable as a battery for an electric vehicle. Like the above, in the battery of Control 2-3, the amount of graphite in the positive electrode conductive material was below 3 weight %, which resulted in lowering of the power. On the other hand, in the battery of Control 2-4 where the amount of graphite in the positive electrode conductive material exceeded 7 weight %, high capacity and high power were obtained, but the battery behavior during continuous charging was violent, and the battery surface temperature resulted in 300° C.

In each battery of Examples 2-6 to 2-16-5 where graphite and amorphous carbon were mixed and used as the positive electrode conductive material, high power could be achieved. Among the batteries of the Examples 2-6 to 2-10 where ketjen black was used as the amorphous carbon, higher power could be obtained in each battery of the Examples 2-8 to 2-10 where the ratio of the particle diameter of the conductive material graphite to the secondary particle diameter of the lithium manganate in the positive electrode active material was 0.2 to 0.8. In the battery of Example 2-7 where the ratio of the particle diameter of the conductive material graphite to the secondary particle diameter of lithium manganate was below 0.2, the battery surface temperature during continuous charging was 200° C. which was slightly higher than that in each battery of the Examples 2-8 to 2-10.

In each battery of Examples 2-11 to 2-16-5 where acetylene black was used in the amorphous carbon, higher power in each battery was obtained and the power retaining percentage after the 100th cycle of charging and discharging cycles was high.

In each battery of Examples 2-12 to 2-14, Examples 2-2-2 to 2-2-4, Examples 2-16-2 to 2-16-4, and Examples 2-17-2 to 2-17-4, where the Li/Mn ratio of lithium manganate was 0.55 or more, its power retaining percentage was very high. However, in each battery of Example 2-15, Example 2-2-5, Example 2-16-5, and Example 2-17-5, where Li/Mn ratio of lithium manganate was above 0.60, lowering of capacity was caused. Therefore, it is found that the Li/Mn ratio is preferably in the range of from 0.55 to 0.60.

In each battery of Example 2-16, Examples 2-16-2 to 2-16-5, Example 2-17, and Examples 2-17-2 to 2-17-5, where amorphous carbon was used the negative electrode, a remarkably high power, a remarkably power retaining percentage and a lowermost battery surface temperature during continuous charging could be obtained. Accordingly, each battery of these Examples 2-16, 2-16-2 to 2-16-5, 2-17, and 2-17-2 to 2-17-5 was one which has a high capacity, a high power and an excellent safety and which was well balanced generally.

As mentioned above, the cylindrical lithium-ion battery 120 according to the present embodiment is a battery whose behavior is remarkably calm even when it is put in an abnormal state and which has an excellent safety. Thus, a battery which has a high capacity and a high power, and whose safety is considerably high is particularly suitable for a power supply for EV.

(Third Embodiment)

Next, a third embodiment where the present invention is applied to a cylindrical lithium-ion battery for HEV will be explained. In this embodiment, a lithium manganese complex oxide(s) suitable for the positive electrode active material and the range of an optimal average particle diameter of the primary particle thereof will be defined. Incidentally, in this embodiment and embodiments subsequent thereto, the same parts or members as those in the first embodiment are denoted by the same reference numerals and explanations thereof will be omitted, and only different parts or members will be explained below.

(Positive Electrode)

A powdered lithium manganate ($Li_{1+x}Mn_{2-x}O_4$ or $Li_{1+x}Mn_{2-x-y}Al_yO_4$), serving as a positive electrode active material, where an average particle diameter of primary particles (hereinafter, called primary particle average diameter) is 2 μm or less, scale-shaped graphite serving as conductive material and a polyvinylidene fluoride (PVDF) as a binder are mixed at a weight % ratio of 85:10:5, and the resultant mixture is added and mixed with N-methyl-2-pyrrolidone (NMP) as dispersion solvent to produce slurry. The slurry thus produced is applied to both surfaces of an aluminum foil (positive electrode collector) having a thickness of 20 μm. The aluminum foil thus applied with the slurry is dried, pressed and cut to obtain a positive electrode having a thickness of 90 μm.

As the lithium manganate, one which has a spinel crystal structure and where the composition ratio (hereinafter, called Li/Mn ratio) of Li to Mn is in a range of from 0.50 to 0.65 was used. Incidentally, the lithium manganate can be composed by mixing and sintering suitable lithium salt and manganese dioxide, and a desired Li/Mn ratio can be obtained by controlling a preparation ratio of the lithium salt and the manganese dioxide. Also, the lithium manganese used herein was prepared such that a plurality of portions thereon were photographed at random by an electron microscope, and the primary particle diameter of the lithium manganese was measured on the basis of the electron microscope photographs obtained, the number average was calculated from the measurement results, and the primary particle average diameter was confirmed beforehand.

(Negative Electrode)

90 weigh parts of amorphous carbon powder is added with 10 weight parts of PDVF as a binder, and the resultant mixture is added and mixed with NMP as dispersion solvent to produce slurry. The slurry thus produced is applied to both surfaces of a rolled copper foil having a thickness of 10 μm. Thereafter, the copper foil thus prepared is dried, pressed and cut to obtain a negative electrode having a thickness of 70 μm.

Next, Examples of the cylindrical lithium-ion battery 20 manufactured according to the present embodiment will be explained. Incidentally, batteries of Controls manufactured for making a comparison with the batteries of Examples will also be explained below.

EXAMPLE 3-1

As shown in Table 5, in Example 3-1, a battery was manufactured using lithium manganate ($Li_{1.06}Mn_{1.94}O_4$) whose Li/Mn ratio was 0.55 and whose primary particle average diameter was 0.1 μm.

TABLE 5

| | PRIMARY PARTICLE DIAMETER (μm) | ACTIVE MATERIAL COMPOSITION | Li/Mn RATIO |
|---|---|---|---|
| Example 3-1 | 0.1 | $Li_{1.06}Mn_{1.94}O_4$ | 0.55 |
| Example 3-2 | 0.5 | $Li_{1.06}Mn_{1.94}O_4$ | 0.55 |
| Example 3-3 | 1.0 | $Li_{1.06}Mn_{1.94}O_4$ | 0.55 |
| Example 3-4 | 2.0 | $Li_{1.06}Mn_{1.94}O_4$ | 0.55 |
| Example 3-5 | 0.1 | $Li_{1.14}Mn_{1.86}O_4$ | 0.60 |
| Example 3-6 | 2.0 | $Li_{1.14}Mn_{1.86}O_4$ | 0.60 |
| Example 3-7 | 0.1 | $LiMn_2O_4$ | 0.50 |
| Example 3-8 | 0.1 | $Li_{1.18}Mn_{1.82}O_4$ | 0.65 |
| Example 3-9 | 0.1 | $Li_{1.03}Mn_{1.87}Al_{0.1}O_4$ | 0.55 |
| Example 3-10 | 2.0 | $Li_{1.03}Mn_{1.87}Al_{0.1}O_4$ | 0.55 |
| Control 3-1 | 0.05 | $Li_{1.06}Mn_{1.94}O_4$ | 0.55 |
| Control 3-2 | 2.5 | $Li_{1.06}Mn_{1.94}O_4$ | 0.55 |
| Control 3-3 | 0.05 | $Li_{1.14}Mn_{1.86}O_4$ | 0.60 |
| Control 3-4 | 2.5 | $Li_{1.14}Mn_{1.86}O_4$ | 0.60 |
| Control 3-5 | 0.05 | $Li_{1.03}Mn_{1.87}Al_{0.1}O_4$ | 0.55 |
| Control 3-6 | 2.5 | $Li_{1.03}Mn_{1.87}Al_{0.1}O_4$ | 0.55 |

EXAMPLES 3-2 TO 3-4

As shown in Table 5, in Examples 3-2 to 3-4, each battery was manufactured in the same manner as the Example 3-1 except that lithium manganate powder whose primary particle average diameters was 0.5 μm, 1.0 μm or 2.0 μm was used as the active electrode active material.

EXAMPLES 3-5 and 3-6

As shown in Table 5, in Examples 3-5 and 3-6, each battery was manufactured in the same manner as the Example 3-1 except that lithium manganate ($Li_{1.14}Mn_{1.86}O_4$) whose Li/Mn ratio was 0.60 was used as the positive electrode active material and the primary particle average diameters were 0.1 μm in the Example 3-5 and 2.0 μm in the Example 3-6.

EXAMPLES 3-7 TO 3-10

As shown in Table 5, in Examples 3-7 to 3-10, each battery was manufactured in the same manner as the Example 3-1 except that lithium manganate ($LiMn_2O_4$) powder whose primary particle average diameter was 0.1 μm and whose Li/Mn ratio was 0.50 was used in Example 3-7, lithium manganate ($Li_{1.18}Mn_{1.82}O_4$) powder whose primary particle average diameter was 0.1 μm and whose Li/Mn ratio was 0.65 was used in Example 3-8, lithium manganate ($Li_{1.03}Mn_{1.87}Al_{0.1}O_4$) powder whose primary particle average diameter was 0.1 μm, where Al was substituted for a portion of Mn, and whose Li/Mn ratio was 0.55 was used in Example 3-9, lithium manganate ($Li_{1.03}Mn_{1.87}Al_{0.1}O_4$) powder whose primary particle average diameter was 2.0 μm, where Al was substituted for a portion of Mn, and whose Li/Mn ratio was 0.55 was used in Example 3-10.

(Controls 3-1 and 3-2)

As shown in Table 5, in Controls 3-1 and 3-2, each battery was manufactured in the same manner as the Example 3-1 except that lithium manganate ($Li_{1.06}Mn_{1.94}O_4$) powder whose primary particle average diameter was 0.05 μm and 2.5 μm, and whose Li/Mn ratio was 0.55 was used as the positive electrode active material.

(Controls 3-3 and 3-4)

As shown in Table 5, in Controls 3-3 and 3-4, each battery was manufactured in the same manner as the Example 3-1 except that lithium manganate ($Li_{1.14}Mn_{1.86}O_4$) powder whose primary particle average diameter was 0.05 μm or 2.5 μm and whose Li/Mn ratio was 0.60 was used as the positive electrode active material.

(Controls 3-5 and 3-6)

As shown in Table 5, in Controls 3-5 and 3-6, each battery was manufactured in the same manner as the Example 3-1 except that lithium manganate ($Li_{1.03}Mn_{1.87}Al_{0.1}O_4$) powder whose primary particle average diameter was 0.05 μm or 2.5 μm, where Al was substituted for a portion of Mn, and whose Li/Mn ratio was 0.55 was used as the positive electrode active material.

[Test & Evaluation]

After each battery manufactured in the above manner was subjected to a 4.1V constant voltage control at a current value (1C) capable of discharging for about 1 hour and was charged up to a full charged state for 3 hours, and it was discharged for 5 seconds at respective current values of 10 A, 30 A and 90 A. Each battery voltages of the respective fifth seconds were measured and a power measurement test was performed that a current value (Ia) where a linear line obtained by plotting the voltages to current values reaches 2.7V, a power ((W)=Ia×2.7) was calculated. This measurement was made in an atmosphere of 25±2° C. The test results of the power measurement test are shown in the following Table 6.

TABLE 6

| | POWER(W) |
|---|---|
| Example 3-1 | 930 |
| Example 3-2 | 950 |
| Example 3-3 | 960 |
| Example 3-4 | 950 |
| Example 3-5 | 920 |
| Example 3-6 | 930 |
| Example 3-7 | 890 |
| Example 3-8 | 880 |
| Example 3-9 | 940 |
| Example 3-10 | 930 |
| Control 3-1 | 800 |
| Control 3-2 | 820 |
| Control 3-3 | 780 |
| Control 3-4 | 800 |
| Control 3-5 | 820 |
| Control 3-6 | 820 |

As shown in Tables 5 and 6, in each battery of the Examples 3-1 to 3-4 where the lithium manganate whose Li/Mn ratio was 0.55 and whose primary particle average diameter was in the range of from 0.1 to 2.0 μm was used as the positive electrode active material, its power measured by the above mentioned measuring method was in the range of from 930 to 960 W. However, in each battery of the Control 3-1 where the lithium manganate whose primary particle average diameter was 0.05 μm was used as the positive electrode active material and the Control 3-2 where the lithium manganate whose primary particle average diameter was 2.5 μm was used as the positive electrode active material, its power was 800 to 820 W.

Also, each battery of the Examples 3-5 to 3-6 where the lithium manganate whose Li/Mn ratio was 0.60 and whose primary particle average diameter was 0.1 or 2.0 μm was used as the positive electrode active material exhibited a power characteristic of 920 to 930 W. However, in each battery of the Controls 3-3 and 3-4 where lithium manganate whose primary particle average diameter was 0.05 μm or 2.5 μm was used as the positive electrode active material, its power was 780 to 800 W. In the cases of the battery of the Example 3-7 where lithium manganate whose Li/Mn ratio was 0.50 and whose primary particle average diameter was 0.1 μm was used as the positive electrode active material and the battery of the Example 3-8 where lithium manganate whose Li/Mn ratio was 0.65 and whose primary particle average diameter was 0.1 μm was used in the positive electrode active material, their powers were slightly inferior to those of the batteries whose Li/Mn ratios were 0.55 and 0.60, but the batteries of these Examples could achieve effects similar to those of the batteries whose Li/Mn ratios were 0.55 and 0.60.

Further, in the case that Al was substituted for a portion of Mn, each battery of the Examples 3-9 and 3-10 where the lithium manganate whose primary particle average diameter was 0.1 or 2.0 μm was used in the positive electrode active material exhibited a power characteristic of 930 to 940 W. However, in each battery of the Controls 3-5 and 3-6 where lithium manganate whose primary particle average diameter was 0.05 μm or 2.5 μm was used in the positive electrode active material, its power was 820 W.

From the above test result, it was found that each battery of the Examples where lithium manganate whose primary particle average diameter was in the range of from 0.1 to 2.0 μm was used as the positive electrode active material demonstrated an excellent power characteristic. Also, among the batteries of the Examples, each battery in which the Li/Mn ratio was in the range of from 0.55 to 0.60 had high power. Such a battery is useful for downsizing because its internal resistance (reaction resistance) is small and high power can be obtained without widening the electrode area.

(Fourth Embodiment)

Next, a fourth embodiment where the present invention is applied to a cylindrical lithium-ion battery for HEV will be explained. The present embodiment is for defining the weight of the primary particle system of the lithium-manganese complex oxide mainly in view of safety.

(Positive Electrode)

90 weight parts of a powdered lithium manganate ($LiMn_2O_4$) is added with 5 weight parts of scale-shaped graphite powder as conductive material and 5 weight parts of PVDF as binder, and the resultant mixture is added and mixed with NMP as dispersion solvent to produce slurry. The slurry thus produced is applied to both surfaces of an aluminum foil having a thickness of 20 $\mu$m, and, after dried, the aluminum foil is pressed and cut off to obtain a positive electrode. The lithium manganate can be obtained by mixing manganese dioxide and lithium carbonate and sintering the mixture at a predetermined temperature. In this embodiment, lithium manganate, where the weight of particles with a particle diameter of 1 $\mu$m or less is 0.01% or less and the specific surface area was 1.0 $m^2/g$ or less is used, obtained by changing the particle diameter and sintering temperature of the manganese dioxide which is row material is used in order to adjust the particle diameter and the specific surface area of the lithium manganate. The weight percentage of particles with a particle diameter of 1 $\mu$m or less was obtained according to an equation of $(B/A) \times 100$ where the weight A of dried lithium manganate and the weight B of the remaining material obtained by filtering lithium manganate in a sucking manner using a membrane with a hole diameter of 1 $\mu$m were measured. Also, the specific surface area was obtained from BET 1 point method based upon nitrogen absorption.

(Negative Electrode)

90 weight parts of amorphous carbon powder as a negative electrode active material is added with 10 weight parts of PVDF as a binder, and the resultant mixture is added and mixed with N-methyl-2-pyrrolidone as dispersion solvent to produce slurry. The slurry thus produced is applied to both surfaces of a rolled copper foil having a thickness of 10 $\mu$m. After dried, the rolled copper foil is pressed and cut off to obtain a negative electrode.

Next, Examples of the cylindrical lithium-ion secondary battery 20 manufactured according to the present embodiments will be explained. Also, batteries of Controls manufactured for comparison will be explained.

EXAMPLES 4-1 TO 4-3

As shown in the following Table 7, in Examples 4-1 to 4-3, each battery was manufactured using lithium manganate, as the positive electrode active material, where the weight of particles with a particle diameter of 1 $\mu$m or less was 0.01% and the specific surface area was 0.4, 0.6 or 1.0 $m^2/g$.

TABLE 7

| | POSITIVE ELECTRODE ACTIVE MATERIAL | |
|---|---|---|
| | PARTICLE WITH PARTICLE DIAMETER OF 1 $\mu$m OR LESS (wt %) | SPECIFIC SURFACE AREA ($m^2/g$) |
| Example 4-1 | 0.01 | 0.4 |
| Example 4-2 | | 0.6 |
| Example 4-3 | | 1.0 |
| Control 4-1 | 0.02 | 0.4 |
| Control 4-2 | | 0.6 |
| Control 4-3 | | 1.0 |
| Control 4-4 | 0.03 | 0.4 |
| Control 4-5 | | 0.6 |
| Control 4-6 | | 1.0 |

(Controls 4-1 to 4-3)

As shown in Table 7, in Controls 4-1 to 4-3, each battery was manufactured in the same manner as the Example 4-1 except for using lithium manganate, as the positive electrode active material, where the weight of particles with a particle diameter of 1 $\mu$m or less was 0.02% and the specific surface area was 0.4, 0.6 or 1.0 $m^2/g$.

(Controls 4-4 to 4-6)

As shown in Table 7, in Controls 4-4 to 4-6, each battery was manufactured in the same manner as the Example 4-1 except for using lithium manganate, as the positive electrode active material, where the weight of particles with a particle diameter of 1 $\mu$m or less was 0.03% and the specific surface area was 0.4, 0.6 or 1.0 $m^2/g$.

[Test & Evaluation]

Each battery of the Examples and the Controls manufactured in the above manner was subjected to an overcharging test where the battery was charged with current of a 3 hour rate (3C) until an abnormal phenomenon occurred in the battery and the maximum reached temperature of the surface of the battery container 7 was measured. The test results of the overcharging test are shown in the following Table 8.

TABLE 8

| | MAXIMUM REACHED TEMPERATURE (° C.) |
|---|---|
| Example 4-1 | 92 |
| Example 4-2 | 98 |
| Example 4-3 | 137 |
| Control 4-1 | 412 |
| Control 4-2 | 387 |
| Control 4-3 | 395 |
| Control 4-4 | 383 |
| Control 4-5 | 420 |
| Control 4-6 | 510 |

As shown in Table 8, each battery of the Controls 4-1 to 4-6 jetted white smoke and its maximum reached temperature was about 400° C. On the other hand, since each battery of the Examples 4-1 to 4-3 which used the lithium manganate where the weight of particles with a particle diameter of 1 $\mu$m or less was 0.01% could be reduced in heat generation due to oxygen desorption reaction by decreasing the area of the boundary per unit volume between the lithium manganate and the non-aqueous electrolytic solution, the battery functions of the battery ceased safely without generating white smoke. Further, since each battery of the Examples 4-1 and 4-2 where the specific surface area was 0.6 $m^2/g$ or less could reduce in the area between the lithium manganate and the non-aqueous electrolytic solution so that the chain reaction between the lithium manganate and the non-aqueous electrolytic solution could be suppressed, the maximum reached temperature was 100° C. or less and the battery was very safe.

(Fifth Embodiment)

Next, a fifth embodiment where the present invention is applied to a cylindrical lithium-ion battery for HEV will be explained. This embodiment is for defining the weight of the primary particle system of lithium-manganese complex oxide mainly in order to maintain a high power of a battery for a long term.

(Positive Electrode)

90 weight parts of a powdered lithium manganate ($LiMn_2O_4$) is added with 5 weight parts of scale-shaped graphite powder as conductive material and 5 weight parts of PVDF as a binder, and the mixture thus produced is added and mixed with NMP as dispersion solvent to produce slurry. The slurry thus produced is applied to both surfaces of an aluminum foil having a thickness of 20 $\mu$m. After dried, the foil is pressed and cut off to obtain a positive electrode.

The lithium manganate can obtained by mixing lithium dioxide and lithium carbonate to sinter the mixture at a predetermined temperature. In this embodiment, lithium manganate, where the weight of particles with a particle diameter of 1 $\mu$m or less is in a range of from 0.01% to 2% and the specific surface area is in a range of from 0.4 $m^2/g$ to 3.0 $m^2/g$ is used, obtained by changing the particle diameter and sintering temperature of the manganese dioxide which is row material was used in order to adjust the particle diameter and the specific surface area of the lithium manganate. The weight percentage of particles with a particle diameter of 1 $\mu$m or less was obtained according to the equation of (B/A)×100, and the specific surface area was obtained from the BET 1 point method based upon nitrogen absorption in the same manner as the fourth embodiment.

(Negative Electrode)

90 weight parts of amorphous carbon powder as a negative electrode active material is added with 10 weight parts of PVDF as a binder, and the resultant mixture is added and mixed with N-methyl-2-pyrrolidone as dispersion solvent to produce slurry. The slurry thus produced is applied to both surfaces of a rolled copper foil having a thickness of 10 $\mu$m. After dried, the rolled copper foil is pressed and cut off to obtain a negative electrode.

Next, Examples of the cylindrical lithium-ion secondary battery 20 manufactured according to the present embodiments will be explained. Also, batteries of Controls manufactured for comparison will be explained.

EXAMPLES 5-1 TO 5-4

As shown in Table 9, in Examples 5-1 to 5-4, each battery was manufactured using lithium manganate, as the positive electrode active material, where the weight of particles with a particle diameter of 1 $\mu$m or less was 2.0%, 1.0%, 0.1% or 0.01% and the specific surface area was 1.0 $m^2/g$.

TABLE 9

| | PARTICLE WITH PARTICLE DIAMETER OF 1 $\mu$m OR LESS (wt %) | SPECIFIC SURFACE AREA ($m^2/g$) |
|---|---|---|
| Example 5-1 | 2.0 | 1.0 |
| Example 5-2 | 1.0 | 1.0 |
| Example 5-3 | 0.1 | 1.0 |
| Example 5-4 | 0.01 | 1.0 |
| Example 5-5 | 0.1 | 3.0 |

TABLE 9-continued

| | PARTICLE WITH PARTICLE DIAMETER OF 1 $\mu$m OR LESS (wt %) | SPECIFIC SURFACE AREA ($m^2/g$) |
|---|---|---|
| Example 5-6 | 0.1 | 2.0 |
| Example 5-7 | 0.1 | 0.6 |
| Example 5-8 | 0.1 | 0.4 |
| Control 5-1 | 3.0 | 1.0 |
| Control 5-2 | 0.005 | 1.0 |

EXAMPLES 5-5 TO 5-8

As shown in Table 9, in Examples 5-5 to 5-8, each battery was manufactured in the same manner as the Example 5-1 except for using lithium manganate, as the positive electrode active material, where the weight of particles with a particle diameter of 1 $\mu$m or less was 0.1% and the specific surface area was 3.0 $m^2/g$, 2.0 $m^2/g$, 0.6 $m^2/g$ or 0.4 $m^2/g$.

(Controls 5-1 and 5-2)

As shown in Table 9, in Controls 5-1 and 5-2, each battery was manufactured in the same manner as the Example 5-1 except for using lithium manganate, as the positive electrode active material, where the weight of particles with a particle diameter of 1 $\mu$m or less was 3.0% or 0.005% and the specific surface area was 1.0 $m^2/g$.

[Test & Evaluation]

Next, regarding each battery manufactured in the above manner, switching between the following pattern 1 and pattern 2 was repeated when the battery voltage reached an upper limit voltage 4.2V or a lower limit voltage 3.0V. The ambient temperature was set to 50° C. in order to accelerate a pulse charging/discharging cycle test. The pattern 1 where a battery gradually becomes a discharged state included charging for 10 seconds with current of 50 A, discharging for 5 seconds with current of 100 A and discharging for 5 seconds with current of 50 A, and pause time for 5 seconds. The pattern 2 where a battery gradually becomes a charged state included charging for 10 seconds with current of 50 A and charging for 5 seconds with current of 50A, discharging for 5 seconds with current of 100 A, and pause time for 5 seconds.

After the battery was maintained in a constant voltage of 4V, respective fifth second voltages obtained when discharging was performed with currents of 25 A, 50 A and 100 A were measured, and a current value (Ia) at a point where a linear line obtained by plotting these voltages to current values crossed 3V was read so that the power (W) was calculated according to a calculation formula (Ia×3.0). The measurement of the power was made before the pulse charging/discharging cycle test (A(W)) and after the pulse charging/discharging cycle test has been performed 100,000 times (B(W)), and a pulse power retaining rate (%) was obtained according to a calculation formula (B/A)×100. The results are shown in the following Table 10.

TABLE 10

| | POWER RETAINING RATE (%) |
|---|---|
| Example 5-1 | 72 |
| Example 5-2 | 85 |
| Example 5-3 | 90 |
| Example 5-4 | 87 |
| Example 5-5 | 58 |
| Example 5-6 | 72 |

TABLE 10-continued

| | POWER RETAINING RATE (%) |
|---|---|
| Example 5-7 | 88 |
| Example 5-8 | 63 |
| Control 5-1 | 48 |
| Control 5-2 | 40 |

In Controls 5-1 and 5-2, the pulse power retaining rate of each battery was 50% or less. In Examples 5-1 to 5-8, each battery exhibited an excellent pulse charging/discharging cycle characteristic where the pulse power retaining rate exceeded 50%. Also, each battery of the Examples except for the Examples 5-5 and 5-8 exhibited more excellent pulse charging/discharging cycle characteristic where the pulse power retaining rate was about 70% or more.

In the battery of the Control 5-1, since the weight of lithium manganate particles with the particle diameter of 1 $\mu$m or less was as much as 3.0%, binding force among the positive electrode active material was reduced and the positive electrode active material fell off during the pulse charging/discharging cycle test, thereby causing lowering of the power. On the other hand, in the battery of the Control 5-2, since the weight of lithium manganate particles with the particle diameter of 1 $\mu$m or less was as small as 0.005%, lithium ions were not inserted smoothly. Therefore, an effect for reducing discharging load acting on the entire positive electrode could not be obtained and the pulse charging/discharging cycle characteristic was lowered.

From the above results, it is found that each battery of the Examples 5-1 to 5-8 where the weight of particles with the particle diameter of 1 $\mu$m or less was in the range of from 0.01% to 2% was used is a battery having an excellent pulse charging/discharging cycle characteristic. In this case, it is found that the battery of the Example using the lithium manganate where the specific surface area was in the range of from 0.6 m$^2$/g to 2.0 m$^2$/g is a battery having an excellent pulse charging/discharging cycle characteristic because such an effect can be expected that the reaction area was increased and the discharging reaction advanced so that the discharging load on the entire positive electrode was reduced, and such an effect can be anticipated that structural destruction of the positive electrode active material is prevented. In this manner, the cylindrical lithium-ion battery 20 of the present embodiment is an excellent battery which can maintain a high power for a long term. Such a battery is especially suitable for a power supply for an electric vehicle.

Incidentally, in the above embodiments, the large-size secondary batteries used for a power supply for HEV have been illustrated, but the present invention is not limited to the sizes of the batteries and the battery capacities described in these embodiments. However, in the case of the cylindrical lithium-ion secondary batteries 20 (the first embodiment, and the third to fifth embodiments), it has been confirmed that the present invention exhibited a significant effect in a battery whose battery capacity is about 3 to 10 Ah, and in the case of the cylindrical lithium-ion secondary battery 120 (the second embodiment), it has been confirmed that the present invention exhibited a significant effect in a battery whose battery capacity is about 20 Ah. Accordingly, it is considered that the borderline lies about 15 Ah in a use of the type where the positive and negative external terminals penetrate the battery lids and the positive and negative external terminals push with each other via the axial core within the battery container. Further, in the above embodiments, the cylindrical batteries have been illustrated, but the present invention is not limited to any specific shape. The present invention is also applicable to a battery with a rectangular cross section and any battery with a polygonal shape.

Also, in the above embodiments, the specific positive electrode active material has been described. However, the positive electrode active material used in the present invention is not limited by any requirement other than the scope of the invention as hereinafter claimed. As the positive electrode active material, it is preferable to use lithium-manganese complex oxides which lithium ions can be occluded in/released from and in which a sufficient amount of lithium has been occluded in advance. In such positive electrode active material, a lithium manganate having a spinel structure or a material where a portion of a manganese site or a lithium site in the crystal is substituted for or doped with another metal element may be employed. The lithium manganate can be composed by mixing suitable lithium salt and manganese dioxide to sinter the mixture, and the desired Li/Mn ratio can be achieved by controlling a preparation ratio of lithium salt and manganese dioxide.

Further, in the third embodiment, the lithium manganate expressed by the chemical formula $Li_{1+x}Mn_{2-x}O_4$ and the lithium manganate where Al is substituted for a portion of manganese in the chemical formula have been illustrated as the positive electrode active material, but the positive electrode active material can also be applied to each battery of the other embodiments (the first, second, fourth, and fifth embodiments). Accordingly, the present invention is applicable not only to the lithium manganate expressed by the above chemical formula but also to lithium manganate in which a sufficient amount of lithium has been occluded, which is expressed by other chemical formulas, may be used. The present invention is also applicable to a case using lithium manganate ($Li_{1+x}Mn_{2-x-y}M_yO_4$) where a portion of Mn is substituted or dope with such a metal element M as Co, Ni, Fe, Cu, Cr, Mg, Zn, V, Ga, B, F or the like instead of Al.

Furthermore, in the above embodiments, the specific negative electrode active material has been illustrated. However, the negative electrode active material used in the present invention is not limited by any requirement other than the scope of the invention as hereinafter claimed. As the material, for example, natural graphite, various artificial graphite materials, cokes amorphous carbon or the like can also be used. The particle shapes of these materials may include scale shape, sphere shape, fiber shape massive shape and the like, and the active material is not limited to particular shapes.

Moreover, in the above embodiments, the example where, as the insulating covering or coating, the adhesive tape comprising the base material of polyimide and the adhesive agent of hexametha-acrylate applied to one side surface thereof was used was illustrated. However, an adhesive tape comprising a base material of polyolefin such as polypropylene or polyethylene and the like acrylic system adhesive agent such as hexametha-acrylate, butyl-acrylate or the like applied to one side surface or both side surfaces of the base material, or tape without applying adhesive agent thereon and comprising polyolefin or polyimide or the like can also be used preferably.

Furthermore, in the above embodiments, the electrolytic solution prepared by dissolving lithium hexafluorophosphate at 1 mole/liter into mixed solution of ethylene carbonate, dimethyl carbonate and diethyl carbonate at the volume ratio of 1:1:1 was illustrated. However, as the non-aqueous electrolytic solution, an electrolytic solution prepared by using an ordinary lithium salt as an electrolyte to dissolve the lithium salt in an organic solvent can be used, where a lithium salt and organic solvent to be used are not limited to specific materials. For example, as the electrolyte, $LiClO_4$, $LiAsF_6$, $LiPF_6$, $LiBF_4$, $LiB(C_6H_5)_4$, $CH_3SO_3Li$, $CF_3SO_3Li$ or the like, or mixture thereof can be used. As the non-aqueous electrolytic solution organic solvent, polypropylene carbonate, ethylene carbonate, 1,2-dimethxy ethane, 1,2-diethxy ethane, γ-butyrolactone, tetrahydrofuran, 1,3-dioxolane, 4-methyl-1,3-dioxolane, diethyl ether, sulfolane, methyl-sulfolane, acetonitrile, propionitrile or the like, or mixed solvent of at least two kinds thereof can be used, and the composition ratio of mixture is not limited to any specific range.

Also, in the above embodiments, the PVDF was used as the binder. However, as binders other than the above-mentioned binder, polymers such as Teflon, polyethylene, polystyrene, polybutadiene, isobutylene-isopren rubber, nitrile rubber, styrene-butadiene rubber, polysulfide rubber, cellulose nitrate, cyanoethyl cellulose, polyvinyl alcohol, various latex, acrylonitrile vinyl fluoride, vinylidene fluoride, propylene fluoride, chloroprene fluoride and the like, and mixture thereof can be used.

What is claimed is:

1. A non-aqueous electrolytic solution secondary battery where an electrode winding group where a positive electrode formed by applying positive electrode active material mixture including a lithium-manganese complex oxide comprising secondary particles formed of aggregated primary particles of said complex oxide and conductive material on both surfaces of a strip-shaped collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure,
wherein an average particle diameter of the primary particles of the lithium-manganese complex oxide is in a range of from 0.1 μm to 2 μm,
wherein the lithium-manganese complex oxide is expressed by a chemical formula $Li_{1+x}Mn_{2-x}O_4$,
wherein $0 \leq x \leq$ about 0.2, and
wherein the weight of particles with a particle diameter of 1 μm or less contained in the lithium-manganese complex oxide is at most 0.01%.

2. A non-aqueous electrolytic solution secondary battery according to claim 1, wherein a Li/Mn composition ratio in the lithium-manganese complex oxide is in a range of from 0.55 to 0.60.

3. A non-aqueous electrolytic solution secondary battery according to claim 1, wherein the amount of application of the lithium-manganese complex oxide per one side surface of the collector is in a range of from 80 g/m² to 160 g/m² and the amount of the conductive material included in the positive electrode active material mixture is in a range of from 8 weight % to 16 weight %.

4. A non-aqueous electrolytic solution secondary battery according to claim 3, wherein the conductive material is mixture of graphite and amorphous carbon.

5. A non-aqueous electrolytic solution secondary battery according to claim 3, wherein the average particle diameter of the graphite is in a range of from 0.2 to 0.8 times as large as that of the secondary particle.

6. A non-aqueous electrolytic solution secondary battery according to claim 4, wherein the amorphous carbon is acetylene black.

7. A non-aqueous electrolytic solution secondary battery according to claim 5, wherein the amorphous carbon is acetylene black.

8. A non-aqueous electrolytic solution secondary battery according to claim 1, wherein the amount of application of the lithium-manganese complex oxide per one side surface of the collector is in a range of from 270 gm² to 330 gm², and the amount of the conductive material included in the positive electrode active material mixture is in a range of from 3 weight % to 7 weight %.

9. A non-aqueous electrolytic solution secondary battery according to claim 8, wherein a Li/Mn composition ratio in the lithium-manganese complex oxide is in a range of from 0.55 to 0.60.

10. A non-aqueous electrolytic solution secondary battery according to claim 1, wherein the specific surface area of the lithium-manganese complex oxide is at most 0.6 m²/g.

11. A non-aqueous electrolytic solution secondary battery according to claim 8, wherein active material in the negative electrode is amorphous carbon.

12. A non-aqueous electrolytic solution secondary battery where an electrode winding group where a positive electrode formed by applying positive electrode active material mixture including a lithium-manganese complex oxide comprising secondary particles formed of aggregated primary particles of said complex oxide and conductive material on both surfaces of a strip-shaped collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure,
wherein an average particle diameter of the primary particles of the lithium-manganese complex oxide is in a range of from 0.1 μm to 2 μm,
wherein the lithium-manganese complex oxide is expressed by a chemical formula $Li_{1+x}Mn_{2-x}O_4$,
wherein $0 \leq x \leq$ about 0.2, and
wherein the weight of particles with a particle diameter of 1 μm or less contained in the lithium-manganese complex oxide is in a range of from 0.01% to 2%.

13. A non-aqueous electrolytic solution secondary battery according to claim 12, wherein the specific surface area of the lithium-manganese complex oxide is in a range of from 0.6 m²/g to 2.0 m²/g.

14. A non-aqueous electrolytic solution secondary battery according to claim 12, wherein a Li/Mn composition ratio in the lithium-manganese complex oxide is in a range of from 0.55 to 0.60.

15. A non-aqueous electrolytic solution secondary battery according to claim 12, wherein the amount of application of the lithium-manganese complex oxide per one side surface of the collector is in a range of from 80 g/m² to 160 gm², and the amount of the conductive material included in the positive electrode active material mixture is in a range of from 8 weight % to 16 weight %.

16. A non-aqueous electrolytic solution secondary battery according to claim 12, wherein the amount of application of the lithium-manganese complex oxide per one side surface of the collector is in a range of from 270 g/m² to 330 g/m², and the amount of the conductive material included in the positive electrode active material mixture is in a range of from 3 weight % to 7 weight %.

17. A non-aqueous electrolytic solution secondary battery according to claim 15, wherein the conductive material is mixture of graphite and amorphous carbon.

18. A non-aqueous electrolytic solution secondary battery according to claim 17, wherein the average particle diameter of the graphite is in a range of from 0.2 to 0.8 times as large as that of the secondary particle.

19. A non-aqueous electrolytic solution secondary battery according to claim 17, wherein the amorphous carbon is acetylene black.

20. A non-aqueous electrolytic solution secondary battery according to claim 18, wherein the amorphous carbon is acetylene black.

21. A non-aqueous electrolytic solution secondary battery according to claim 16, wherein a Li/Mn composition ratio in the lithium-manganese complex oxide is in a range of from 0.55 to 0.60.

22. A non-aqueous electrolytic solution secondary battery according to claim 16, wherein active material in the negative electrode is amorphous carbon.

23. A non-aqueous electrolytic solution secondary battery where an electrode winding group where a positive electrode formed by applying positive electrode active material mixture including a lithium-manganese complex oxide comprising secondary particles formed of aggregated primary particles of said complex oxide and conductive material on both surfaces of a strip-shaped collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure, wherein an average particle diameter of the primary particles of the lithium-manganese complex oxide is in a range of from 0.1 $\mu$m to 2 $\mu$m, wherein the lithium-manganese complex oxide is prepared by substituting or doping a portion of Mn with another metal element in a chemical formula $Li_{1+x}Mn^{2-x}O^4$, wherein $0 \leq x \leq$ about 0.2, and wherein the weight of particles with a particle diameter 1 $\mu$m or less contained in the lithium-manganese complex oxide is at most 0.01%.

24. A non-aqueous electrolytic solution secondary battery according to claim 23, wherein the specific surface area of the lithium-manganese complex oxide is at most 0.6 $m^2/g$.

25. A non-aqueous electrolytic solution secondary battery where an electrode winding group where a positive electrode formed by applying positive electrode active material mixture including a lithium-manganese complex oxide comprising secondary particles formed of aggregated primary particles of said complex oxide and conductive material on both surfaces of a strip-shaped collector by approximately even amounts to the both surfaces and a negative electrode from/in which lithium ions can be released/occluded through charging/discharging are wound through a separator is accommodated into a battery container having an internal pressure releasing mechanism which releases internal pressure at a predetermined internal pressure, wherein an average particle diameter of the primary particles of the lithium-manganese complex oxide is in a range of from 0.1 $\mu$m to 2 $\mu$m, wherein the lithium-manganese complex oxide is prepared by substituting or doping a portion of Mn with another metal element in a chemical formula $Li_{1+x}Mn^{2-x}O_4$, wherein $0 \leq x \leq$ about 0.2, and wherein the weight of particles with a particle diameter of 1 $\mu$m or less contained in the lithium-manganese complex oxide is in a range of from 0.01% to 2%.

26. A non-aqueous electrolytic solution secondary battery according to claim 25, wherein the specific surface area of the lithium-manganese complex oxide is in a range of from 0.6 $m^2/g$ to 2.0 $m^2/g$.

* * * * *